(12) United States Patent
Ogawa et al.

(10) Patent No.: US 8,650,721 B2
(45) Date of Patent: Feb. 18, 2014

(54) BUCKLE DEVICE FOR SEAT BELT AND MANUFACTURING METHOD THEREOF

(75) Inventors: Kiyoshi Ogawa, Yokohama (JP); Goushu Kataoka, Yokohama (JP); Katsuyasu Ono, Yokohama (JP); Yuji Sakata, Yokohama (JP); Hitoshi Futaki, Yokohama (JP); Masanao Yamazaki, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 751 days.

(21) Appl. No.: 12/676,800

(22) PCT Filed: Sep. 11, 2008

(86) PCT No.: PCT/JP2008/066388
§ 371 (c)(1),
(2), (4) Date: Jun. 9, 2010

(87) PCT Pub. No.: WO2009/035022
PCT Pub. Date: Mar. 19, 2009

(65) Prior Publication Data
US 2010/0257708 A1    Oct. 14, 2010

(30) Foreign Application Priority Data
Sep. 11, 2007 (JP) ................... 2007-235456

(51) Int. Cl.
*A44B 11/00* (2006.01)
*B60R 22/22* (2006.01)

(52) U.S. Cl.
USPC ....... 24/182; 24/197; 24/265 BC; 24/265 EC; 24/633; 280/801.1

(58) Field of Classification Search
CPC ..................................................... B60R 22/00

USPC ....... 24/182, 191, 196, 197, 265 BC, 265 EC, 24/265 R, 200, 593.1, 633; 280/801.1
See application file for complete search history.

(56) References Cited

U.S. PATENT DOCUMENTS

| 4,103,933 | A | * | 8/1978 | Fisher et al. ................. 297/468 |
| 4,645,231 | A |   | 2/1987 | Takada |
| 4,966,393 | A | * | 10/1990 | Tokugawa ................. 280/801.1 |
| 5,048,865 | A | * | 9/1991 | Tokugawa ................. 280/801.1 |
| 7,383,620 | B2 | * | 6/2008 | Smith ............................. 24/633 |
| 7,516,711 | B2 | * | 4/2009 | Messner et al. .......... 112/475.01 |

(Continued)

FOREIGN PATENT DOCUMENTS

| EP | 1 557 327 | 7/2005 |
| EP | 1 688 324 | 8/2006 |

(Continued)

OTHER PUBLICATIONS

International Search Report in International Application No. PCT/JP2008/066388, dated Oct. 28, 2008, 2 pages.

(Continued)

*Primary Examiner* — Robert J Sandy
*Assistant Examiner* — Tyler Johnson
(74) *Attorney, Agent, or Firm* — Brinks Gilson & Lione

(57) ABSTRACT

A buckle device 10 for a seat belt includes: an anchor plate 11 that can be attached to a vehicle body side; a buckle 20 to which a tongue of the seat belt can be detachably attached; and a woven fabric 30 that is passed through hole portions 14, 26 formed respectively in the anchor plate 11 and the buckle 20, the woven fabric 30 being folded back so as to overlap at least triply and being sewn together in the overlapping part. A tip end portion 31a of the woven fabric 30 tucked into the inner side contacts the opposing buckle 20.

19 Claims, 22 Drawing Sheets

(56) References Cited

U.S. PATENT DOCUMENTS

| | | | |
|---|---|---|---|
| 7,914,045 B2* | 3/2011 | Messner et al. | 280/801.1 |
| 2005/0155193 A1* | 7/2005 | Bell | 24/302 |
| 2006/0254033 A1* | 11/2006 | Smith | 24/633 |

FOREIGN PATENT DOCUMENTS

| | | |
|---|---|---|
| JP | 62-11055 | 1/1987 |
| JP | 63-25669 | 2/1988 |
| JP | 1-117963 | 10/1989 |
| JP | 3-44059 | 4/1991 |
| WO | WO 2009/035022 A1 | 3/2009 |

OTHER PUBLICATIONS

International Search Report in International Application No. PCT/JP2008/066388, dated Oct. 28, 2008, 9 pages.

Supplementary European Search Report Mailed Oct. 20, 2011, two pages.

* cited by examiner (a)

(b)

(a)

(b)

(c)

BUCKLE DEVICE FOR SEAT BELT AND MANUFACTURING METHOD THEREOF

This application is a National Stage of International Application PCT/JP2008/066388 filed on Sep. 11, 2008, which claims priority to Japanese Patent Application No. JP2007-235456 filed with the Japanese Patent Office on Sep. 11, 2007, the entirety of which are hereby incorporated by reference.

TECHNICAL FIELD

The present invention relates to a buckle device for a seat belt installed in a side portion of a vehicle seat, and a manufacturing method thereof.

BACKGROUND ART

A three-point seat belt device employing webbing is used as a typical seat belt device for holding a vehicle occupant or the like safely in a seat. In this type of seat belt device, one end portion of the webbing is latched to a retractor and another end portion is latched to a lap anchor fixed to a vehicle body via a through anchor. By engaging a through tongue disposed in an intermediate portion of the webbing between the lap anchor and the through anchor with a buckle device fixed to a vehicle body inner side, the occupant is restrained in the seat.

The buckle device is normally constituted by an anchor plate that can be attached to the vehicle body side, a buckle to which the tongue of the seat belt can be detachably attached, and a connecting member that connects the anchor plate to the buckle (see Patent Document 1, for example).

Patent Document 1: Japanese Utility Model Application Publication No. 1-117963

Incidentally, when a buckle device is used in a rear seat of an automobile, the buckle device preferably possesses a predetermined rigidity that enables the buckle to stand by itself relative to the anchor plate but does not cause an obstruction to a boarding/alighting occupant.

DISCLOSURE OF THE INVENTION

The present invention has been designed in consideration of the circumstances described above, and an object thereof is to provide a buckle device for a seat belt and a manufacturing method thereof in which a predetermined rigidity is maintained by a woven fabric that connects a buckle to an anchor plate so that the buckle can be made to stand by itself. Despite being self-standing, the buckle does not cause an obstruction when an occupant sits down, and an improvement in the seating comfort of the occupant can be achieved.

The present invention achieves the object described above by means of the following constitutions.

(1) A buckle device for a seat belt, including:
an anchor plate that can be attached to a vehicle body side;
a buckle to which a tongue of the seat belt can be detachably attached; and
a woven fabric that is passed through hole portions formed respectively in the anchor plate and the buckle and then folded back so as to overlap at least triply,
wherein the overlapping part includes a tucked-in part that is tucked into an inner side, a front surface part that is folded back from the tucked-in part and forms a continuation thereof, and a rear surface part that is folded back from the front surface part and forms a continuation thereof,
respective width direction edge portions of respective folded-back parts formed by passing the woven fabric through the hole portions formed respectively in the anchor plate and the buckle and then folding the woven fabric back are doubled back on the inner side toward a width direction intermediate portion, and the woven fabric is sewn in the at least triply overlapped part.

(2) The buckle device for a seat belt according to (1), wherein a tip end portion of the tucked-in part contacts the opposing buckle or anchor plate.

(3) The buckle device for a seat belt according to (2), wherein the tip end portion of the tucked-in part contacts a metal plate portion for forming the hole portion of the buckle.

(4) The buckle device for a seat belt according to any of (1) to (3), wherein the woven fabric is tacked in a part where the tucked-in part and the front surface part overlap.

(5) The buckle device for a seat belt according to any of (1) to (4), wherein a resin sheet is interposed from the folded-back parts to the overlapping part.

(6) The buckle device for a seat belt according to (5), wherein the sewn part is divided in the width direction of the woven fabric, and the resin sheet passes a position that deviates from the sewn part in which the woven fabric is sewn and continues to the vicinity of the respective hole portions of the anchor plate and the buckle.

(7) The buckle device for a seat belt according to any of (1) to (6), wherein the woven fabric is sewn in the triply overlapped part up to positions near the parts where the respective width direction edge portions are doubled back on the inner side toward the width direction intermediate portion.

(8) The buckle device for a seat belt according to any of (1) to (7), wherein the overlapping part of the woven fabric is formed with an arch-shaped cross-section.

(9) The buckle device for a seat belt according to any of (1) to (8), wherein a periphery of the overlapping part of the woven fabric is covered by a resin member.

(10) The buckle device for a seat belt according to any of (1) to (9), wherein, in the overlapping part, the front surface part between the folded-back parts that pass through the respective hole portions of the buckle and the anchor plate is sewn in a state where the respective width direction edge portions are doubled back on the inner side toward the width direction intermediate portion.

(11) The buckle device for a seat belt according to (10), wherein the woven fabric is cross-stitched in the width direction so as to cross the tucked-in part from the tucked-in part over the front surface part, and the overlapping part has an arch-shaped cross-section.

(12) The buckle device for a seat belt according to any of (1) to (11), wherein the rear surface part extends to the vicinity of the hole portion of one of the buckle and the anchor plate.

(13) The buckle device for a seat belt according to (12), wherein a lengthwise direction tip end portion of the rear surface part is formed by heat cutting into a piping shape having a dimension that is equal to or greater than a thickness of the woven fabric.

(14) The buckle device for a seat belt according to (12) or (13), wherein the rear surface part includes a part located in a region extending from a part sewn in a lengthwise direction to the tip end portion where threads on at least one of an inside surface and an outside surface are fixed to each other by hot-melting.

(15) The buckle device for a seat belt according to any of (12) to (14), wherein threads on an ear portion of the woven fabric are fixed to each other by hot-melting.

(16) A method of manufacturing a buckle device for a seat belt including an anchor plate that can be attached to a vehicle body side; a buckle to which a tongue of the seat belt can be detachably attached; and a woven fabric that is passed through hole portions formed respectively in the anchor plate and the buckle and then folded back so as to overlap at least triply, the woven fabric including a tucked-in part that is tucked into an inner side, a front surface part that is folded back from the tucked-in part and forms a continuation thereof, and a rear surface part that is folded back from the front surface part and forms a continuation thereof, wherein the method includes the steps of:

passing a part of the woven fabric, which has a substantially uniform width from the tucked-in part to the rear surface part, through the respective hole portions in a state where respective width direction edge portions thereof are doubled back on the inner side toward a width direction intermediate portion; and sewing the part that is overlapped at least triply while the respective width direction edge portions of folded-back parts, which are folded back by passing the woven fabric through the respective hole portions, remain doubled back on the inner side toward the width direction intermediate portion.

(17) The method of manufacturing a buckle device for a seat belt according to (16), further including the step of tacking a doubly overlapped part after passing the woven fabric through one of the hole portions in the anchor plate and the buckle and folding the woven fabric back.

(18) The method of manufacturing a buckle device for a seat belt according to (16) or (17), further including the step of causing a tip end portion of the tucked-in part to contact the anchor plate or the buckle.

(19) A buckle device for a seat belt, including:
an anchor plate that can be attached to a vehicle body side;
a buckle to which a tongue of the seat belt can be detachably attached; and
an overlapping part that is formed by passing a woven fabric through hole portions formed respectively in the anchor plate and the buckle and then folding the woven fabric back so as to overlap at least triply, and sewing the woven fabric in the at least triply overlapped part,
wherein a resin sheet is accommodated in the overlapping part overlapped by folding back the woven fabric.

(20) The buckle device for a seat belt according to (19), wherein the resin sheet passes a position that deviates from a sewn part in which the woven fabric is sewn, and continues to the vicinity of the respective hole portions in the anchor plate and the buckle.

(21) A buckle device for a seat belt, including:
an anchor plate that can be attached to a vehicle body side;
a buckle to which a tongue of the seat belt can be detachably attached; and
an overlapping part that is formed by passing a woven fabric through hole portions formed respectively in the anchor plate and the buckle and then folding the woven fabric back so as to overlap at least triply, and sewing the woven fabric in the at least triply overlapped part,
wherein respective width direction edge portions of the woven fabric are doubled back on an inner side toward a width direction intermediate portion in the respective hole portions of the anchor plate and the buckle, and
the woven fabric is sewn up to positions in the vicinity of the folded back parts of the overlapping part.

(22) The buckle device for a seat belt according to (21), wherein the overlapping part of the woven fabric is formed with an arch-shaped cross-section.

(23) The buckle device for a seat belt according to (22), wherein a periphery of the overlapping part of the woven fabric is covered by a resin member.

With both the buckle device for a seat belt and the manufacturing method thereof according to the present invention, the woven fabric is passed through the hole portions formed respectively in the anchor plate and the buckle, folded back so as to overlap at least triply, and sewn in the overlapping part. Further, the respective width direction edge portions of the respective folded-back parts which are folded back by passing the woven fabric through the hole portions formed respectively in the anchor plate and the buckle are also doubled back on the inner side toward the width direction intermediate portion. Therefore, a predetermined rigidity can be maintained in the woven fabric over the overlapping part and the folded-back parts, and as a result, a self-standing property can be ensured, thereby enabling an improvement in the seating comfort of an occupant.

Further, the tip end portion of the woven fabric that is tucked into the inner side is caused to contact the opposing buckle or anchor plate, and therefore a further improvement in rigidity can be achieved by the woven fabric, enabling a further improvement in the seating comfort of the occupant.

Furthermore, the doubly overlapped part is tacked after passing the woven fabric through one of the hole portions in the anchor plate and the buckle and folding the woven fabric back, the tip end portion of the overlapped woven fabric is caused to contact the other of the anchor plate and the buckle, and in this state, the woven fabric is passed through the other hole portion formed in the anchor plate or the buckle and folded back to form the triply overlapped part, whereupon the triply overlapped part is sewn. Thus, the overlapping part can be prevented from shifting during sewing and the tip end portion of the woven fabric tucked into the inner side can be brought into contact with the anchor plate or the buckle reliably, thereby leading to improvements in the workability of the sewing operation and the rigidity of the woven fabric.

Moreover, in the overlapping part, the front surface part between the two hole portions, which is formed by passing the woven fabric through one of the hole portions in the buckle and the anchor plate, is sewn in a state where the respective width direction edge portions thereof are doubled back on the inner side toward the width direction intermediate portion, and therefore the flexural rigidity of the woven fabric can be improved. As a result, the self-standing property of the woven fabric can be guaranteed.

BRIEF DESCRIPTION OF THE DRAWINGS

FIG. 1 shows a buckle device for a seat belt according to a first embodiment of the present invention, wherein FIG. 1(a) is a front view and FIG. 1(b) is a side view;

FIG. 4 shows a buckle device for a seat belt according to a second embodiment of the present invention, wherein FIG. 4(a) is a front view and FIG. 4(b) is a side view;

FIG. 5 shows a process for tacking the buckle device of FIG. 4, wherein FIG. 5(a) is a principal front view and FIG. 5(b) is a principal side view;

FIG. 6 shows a buckle device for a seat belt according to a third embodiment of the present invention, wherein FIG. 6(a) is a front view and FIG. 6(b) is a side view;

FIG. 8 shows a buckle device for a seat belt according to a modified example of the third embodiment of the present invention, wherein FIG. 8(a) is a front view and FIG. 8(b) is a sectional view taken along a VIII-VIII line in FIG. 8(a);

FIG. 9 shows a buckle device for a seat belt according to a modified example of a fourth embodiment of the present invention, wherein FIG. 9(a) is a front view and FIG. 9(b) is a sectional view taken along a IX-IX line in FIG. 9(a);

FIG. 10 shows a buckle device for a seat belt according to a fifth embodiment of the present invention, wherein FIG. 10(a) is a front view and FIG. 10(b) is a sectional view taken along a X-X line in FIG. 10(a);

FIG. 13 shows a buckle device for a seat belt according to a sixth embodiment of the present invention, wherein FIG. 13(a) is a front view and FIG. 13(b) is a sectional view taken along a XIII-XIII line in FIG. 13(a);

FIG. 15 shows a buckle device for a seat belt according to a seventh embodiment of the present invention, wherein FIG. 15(a) is a front view and FIG. 15(b) is a sectional view taken along a XV-XV line in FIG. 15(a);

FIG. 18 shows a buckle device for a seat belt according to an eighth embodiment of the present invention, wherein FIG. 18(a) is a front view and FIG. 18(b) is a sectional view taken along an XVIII-XVIII line in FIG. 18(a);

FIG. 20 shows a buckle device for a seat belt according to a ninth embodiment of the present invention, wherein FIG. 20(a) is a front view and FIG. 20(b) is a sectional view taken along a XX-XX line in FIG. 20(a);

Figure 1:
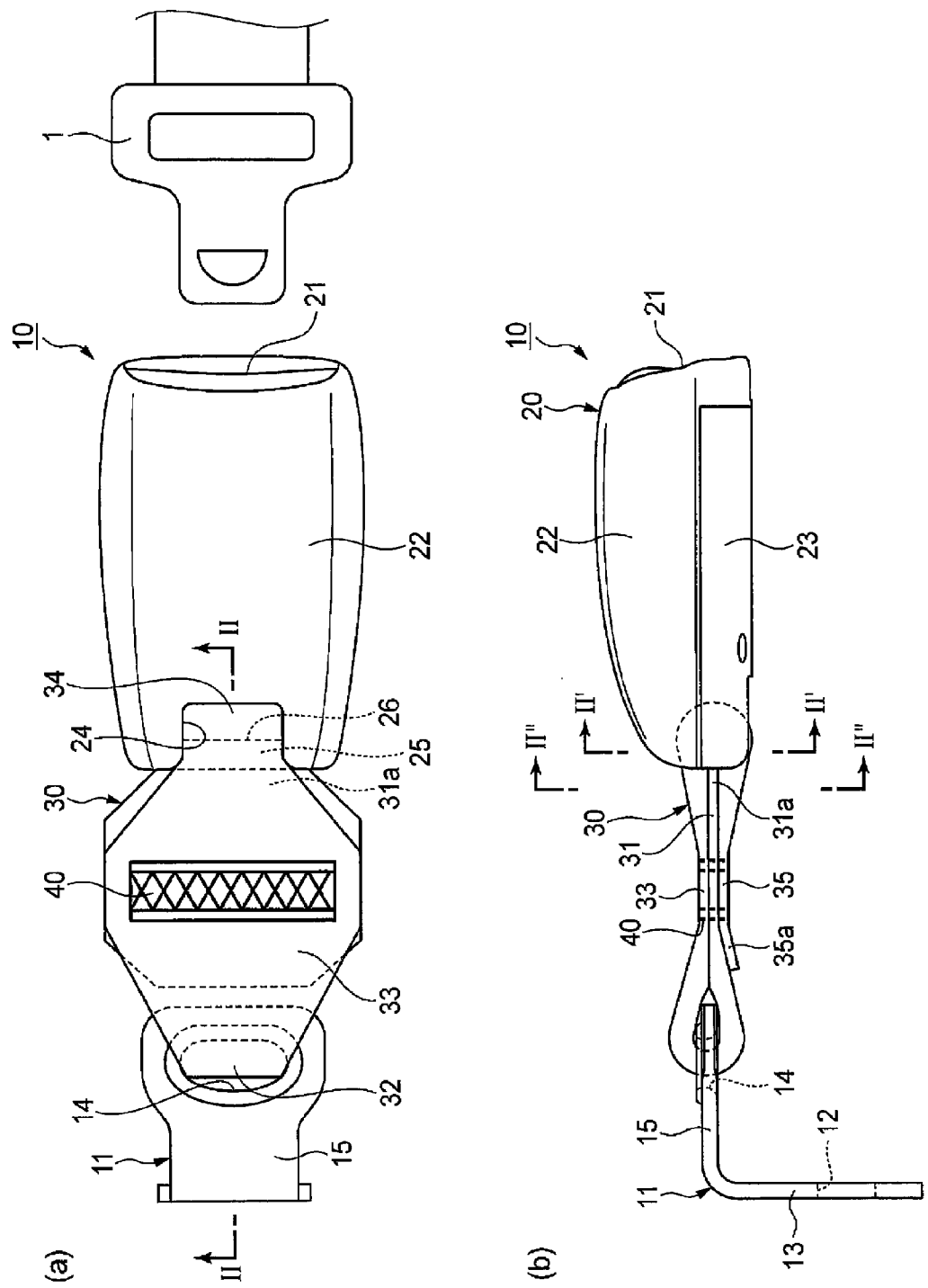

DESCRIPTION OF REFERENCE NUMERALS 10 buckle device
11 anchor plate
14 hole portion
20 buckle
26 hole portion
30 woven fabric
31 tucked-in part
33 front surface part
35 rear surface part
40 thread

BEST MODE FOR CARRYING OUT THE INVENTION

Examples of a buckle device for a seat belt and a manufacturing method thereof according to embodiments of the present invention will be described in detail below with reference to the drawings.

(First Embodiment)

Figure 2:
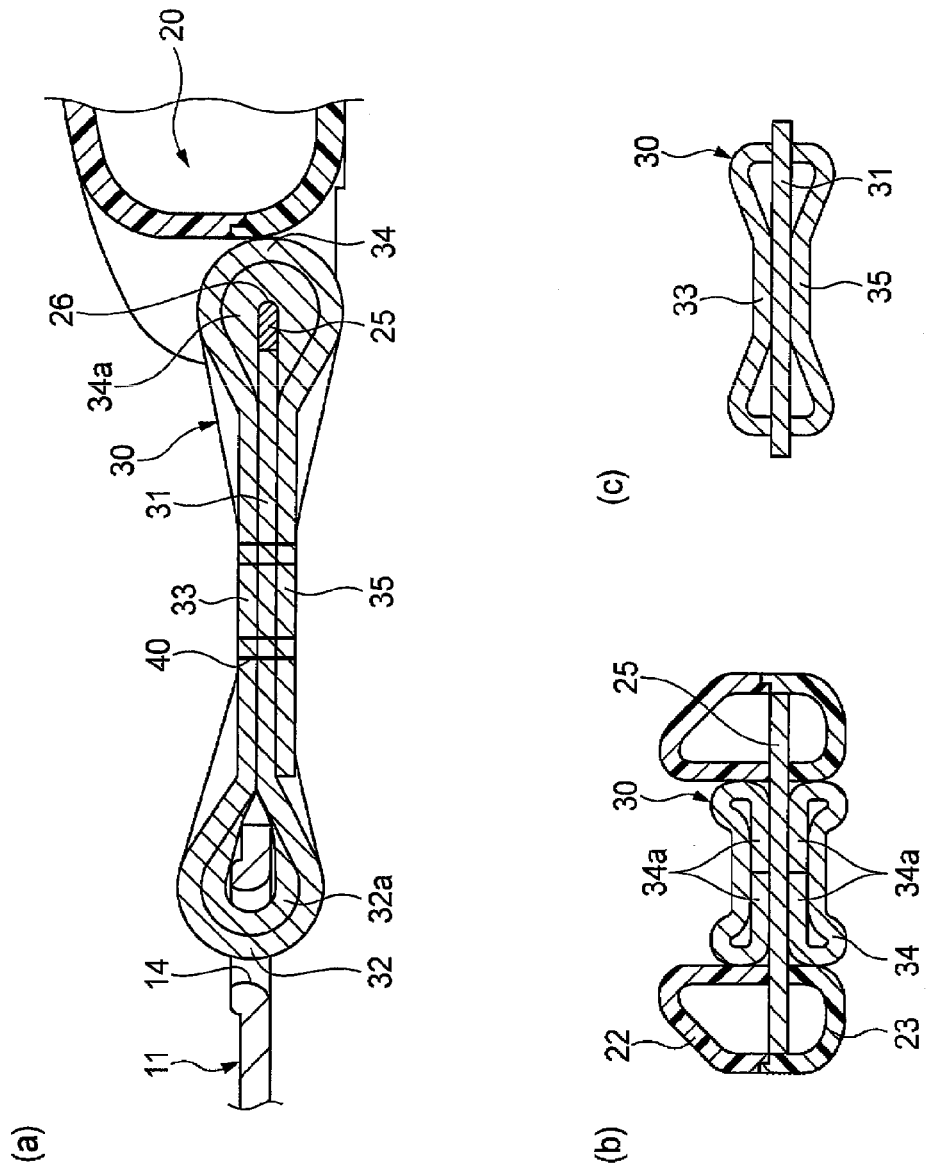
FIG. 2(a) is a sectional view taken along a II-II line in FIG. 1(a)
FIG. 2(b) is a sectional view taken along a II'-II' line in FIG. 1(b)
FIG. 2(c) is a sectional view taken along a II"-II" line in FIG. 1(b)
Figure 3:
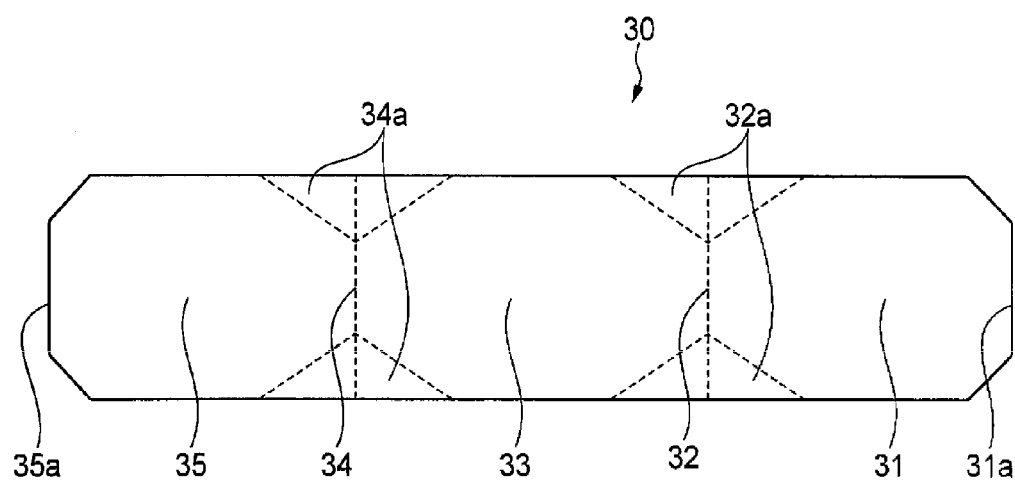
FIG. 3 is an expanded view of a woven fabric shown in FIG. 1.

As shown in FIGS. 1 to 3, a buckle device 10 for a seat belt according to a first embodiment of the present invention includes an anchor plate 11 that can be attached to a vehicle body side, a buckle 20 to which a tongue 1 of the seat belt can be detachably attached, and a woven fabric 30 having a strip-like form that connects the anchor plate 11 to the buckle 20.

The anchor plate 11 is formed substantially in an L-shape and includes a planar portion 13 that is fastened by a bolt (not shown) to a floor surface on the vehicle body side by inserting the bolt into a fastening hole 12, and an upright portion 15 that is bent from the planar portion 13 and formed with a hole portion 14 in an end portion thereof.

A tongue insertion portion 21 is provided on one end side of the buckle 20, and a hole portion 26 is formed on another end side by laying a metal plate portion 25 in a width direction across a recess portion 24 formed by a pair of resin covers 22, 23.

The woven fabric 30 is passed through the hole portions 14, 26 formed respectively in the anchor plate 11 and buckle, folded back, and then sewn in a triply overlapped portion thereof using thread 40. As shown in FIG. 3, the woven fabric 30 is formed from webbing having a constant width, which is cut into a predetermined length and chamfered on all four corners, and includes a tucked-in part 31 that is tucked into an inner side when the woven fabric 30 is overlapped, a lower side folded-back part 32 that is folded back at the hole portion 14 of the anchor plate 11, a front surface part 33 that forms a continuation of the tucked-in part 31 via the lower side folded-back part 32, an upper side folded-back part 34 that is folded back at the hole portion 26 of the buckle 20, and a rear surface part 35 that forms a continuation of the upper side folded-back part 34 and sandwiches the tucked-in part 31 together with the front surface part 33. In other words, the woven fabric 30 has a substantially uniform width from the tucked-in part 31 to the rear surface part 35, excluding the four corners.

As shown in FIGS. 2(a) and 2(b), respective width direction edge portions 32a, 34a of the lower side and upper side folded-back parts 32, 34 positioned respectively in the hole portions 14, 26 of the anchor plate 11 and the buckle 20 are doubled back on the inner side toward a width direction intermediate portion in order to increase a section modulus of these parts 32, 34. Further, the triply overlapped tucked-in part 31, the front surface part 33 and the rear surface part 35 are chamfered on both lengthwise direction sides so as to have a greater width than the lower side and the upper folded-back parts 32, 34, and by sewing a substantially intermediate overlapping part in the lengthwise direction as shown in FIG. 1(a) to connect the anchor plate 11 and the buckle 20.

As shown in FIG. 2(a), in the woven fabric 30 sewn in this manner, a tip end portion 31a of the tucked-in part 31 tucked into the inner side has a substantially identical width to the front surface and rear surface parts 33, 35 in an identical lengthwise direction position, and contacts the opposing metal plate portion 25 of the buckle 20. Thus, a predetermined rigidity is maintained in the buckle device 10 by the woven fabric 30, and as a result, a self-standing property of the buckle 20 and the seating comfort of an occupant can be improved.

Further, the woven fabric 30 includes the overlapping part that is folded back through the hole portions 14, 26 formed respectively in the anchor plate 11 and buckle 20 and sewn in the triply overlapped part, and the two width direction edge portions 32*a*, 34*a* that are doubled back on the inner side toward the width direction intermediate portion in the respective hole portions 14, 26 of the anchor plate 11 and buckle 20. The woven fabric 30 is sewn in at least the triply overlapping part, and the sewn part extends up to the vicinity of the width direction end portion of the woven fabric 30. With the two doubled-back end portions 32*a*, 34*a* disposed on either side and the sewn part extending up to the vicinity of the width direction [end portion] of the woven fabric 30, sufficient rigidity for securing a self-standing property in the buckle 20 is obtained while preventing the buckle 20 from causing an obstruction when the occupant sits down.

Note that mutually contacting surfaces of the woven fabric 30, or more specifically, the edge portions 32*a*, 34*a* of the folded-back parts 32, 34 or a part in which an end portion 35*a* of the rear surface part 35 contacts the tucked-in part 31, and so on are joined by adhesion or the like.

Further, during manufacture of the buckle device 10, the respective folded-back parts 32, 34, the front surface part 33 and one of the tucked-in part 31 and the rear surface part 35 of the woven fabric 30 are passed through the respective hole portions 14, 26 with both width direction edge portions thereof doubled back on the inner side toward the width direction intermediate portion while leaving the other of the tucked-in part 31 and the rear surface part 35 as is. Then, with the width direction edge portions 32*a*, 34*a* of the respective folded-back parts 32, 34 remaining doubled back on the inner side toward the width direction intermediate portion, the folded-back front surface part 33 and one of the tucked-in part 31 and the rear surface part 35 are unfolded, whereupon the at least triply overlapped part 31, 33, 35 is sewn.

Alternatively, the respective folded-back parts 32, 34, the tucked-in part 31 and the rear surface part 35 of the woven fabric 30 are passed through the respective hole portions 14, 26 with both width direction edge portions thereof doubled back on the inner side toward the width direction intermediate portion while leaving the front surface part 33 as is. Then, with the width direction edge portions 32*a*, 34*a* of the respective folded-back parts 32, 34 remaining doubled back on the inner side toward the width direction intermediate portion, the tucked-in part 31 and the rear surface part 35 are unfolded, whereupon the at least triply overlapped part 31, 33, 35 is sewn.

(Second Embodiment)

Figure 4:
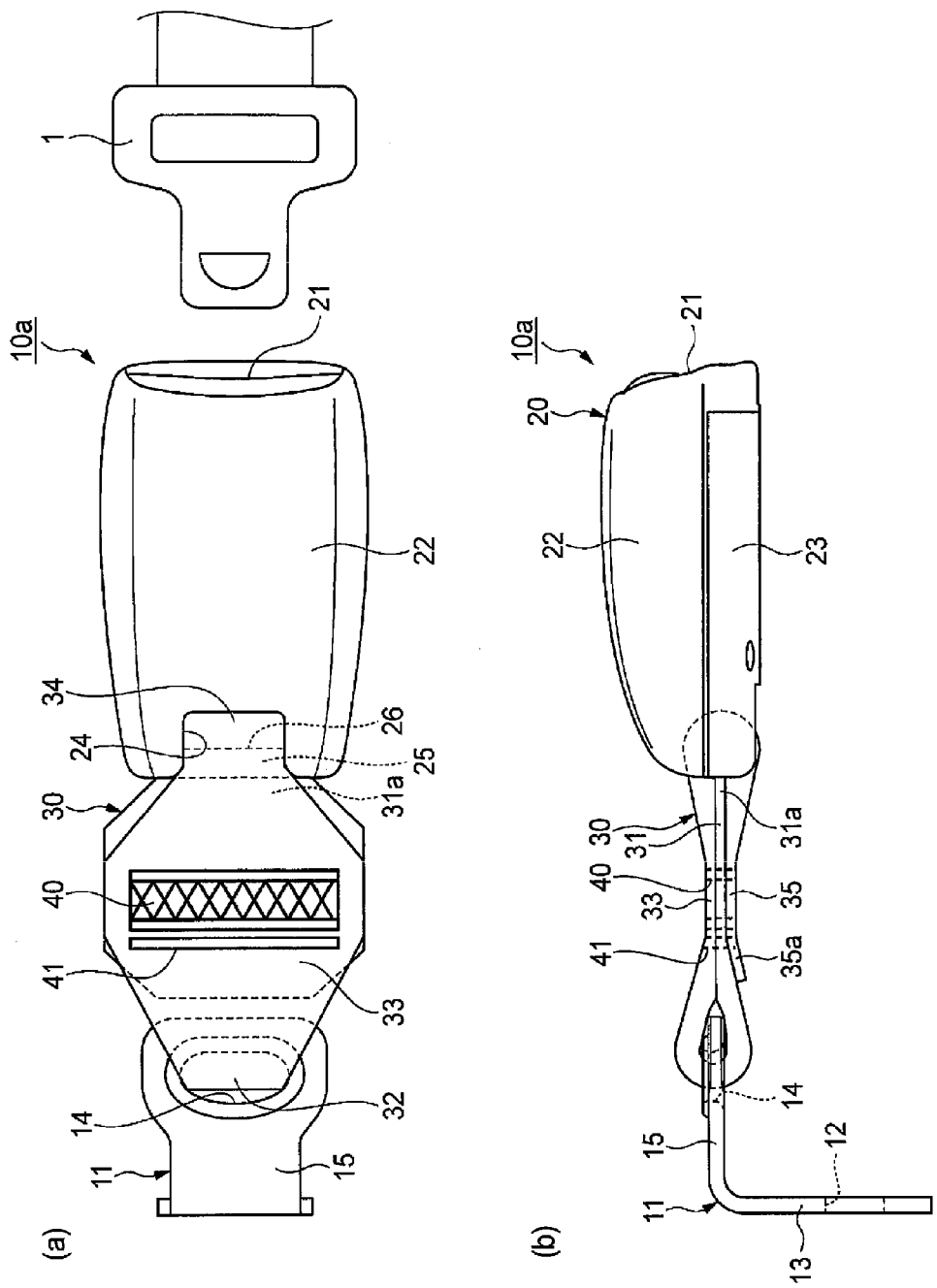
Figure 5:
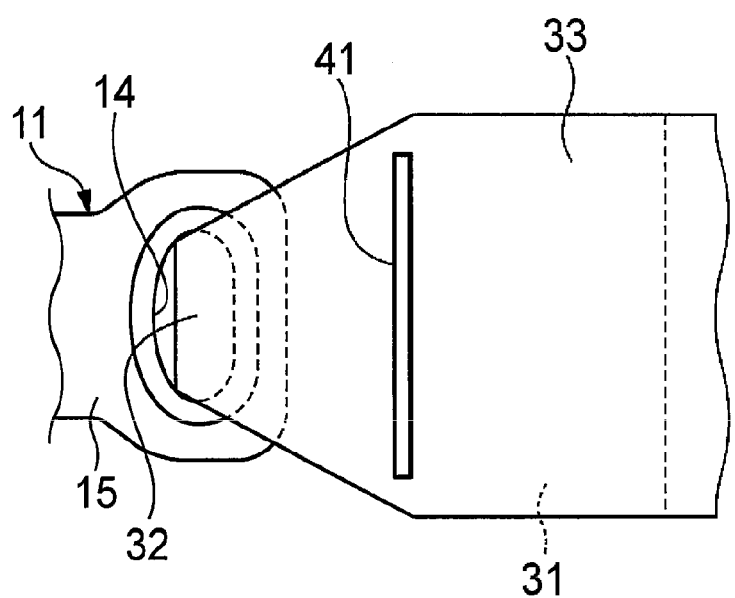
Figure 5:
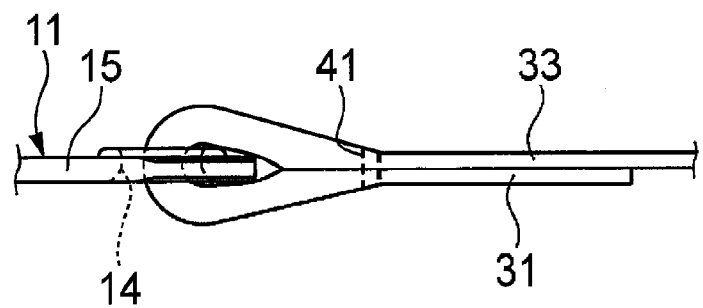

A buckle device 10*a* for a seat belt according to a second embodiment shown in FIGS. 4 and 5 differs from that of the first embodiment in that tacking is performed on the woven fabric 30.

More specifically, in the woven fabric 30, the part in which the tucked-in part 31 tucked into the inner side and the front surface part 33 that passes through the hole portion 14 in the anchor plate 11 as a continuation of the tucked-in part 31 overlap is tacked further toward the anchor plate side than the thread 40 using thread 41.

Hence, in this buckle device 10*a*, as shown in FIG. 5, first the tucked-in part 31 of the woven fabric 30 is passed through the hole portion 14 in the anchor plate 11 and folded back at the lower side folded-back part 32, whereupon a part in which the tucked-in part 31 and the front surface part 33 doubly overlap is tacked. The rear surface part 35 is then passed through the hole portion 26 in the buckle 20 such that the tip end portion 31*a* of the overlapping woven fabric 30 comes into contact with the metal plate portion 25 of the buckle 20 and folded back at the upper side folded-back part 34, whereupon the triply overlapped part is sewn.

When tacking is performed in this manner, the triply overlapped part can be prevented from shifting during sewing by tacking the anchor plate side in cases where it is difficult to sew the overlapping part at one time, such as a case where the overall length of the woven fabric 30 is short, and as a result, the workability of the sewing operation can be improved. Further, the tip end portion 31*a* of the woven fabric 30, which is tucked into the inner side, can be brought reliably into contact with the buckle 20, and as a result, the rigidity of the woven fabric 30 can be improved.

Note that all other constitutions and actions are identical to those of the first embodiment.

(Third Embodiment)

Figure 6:
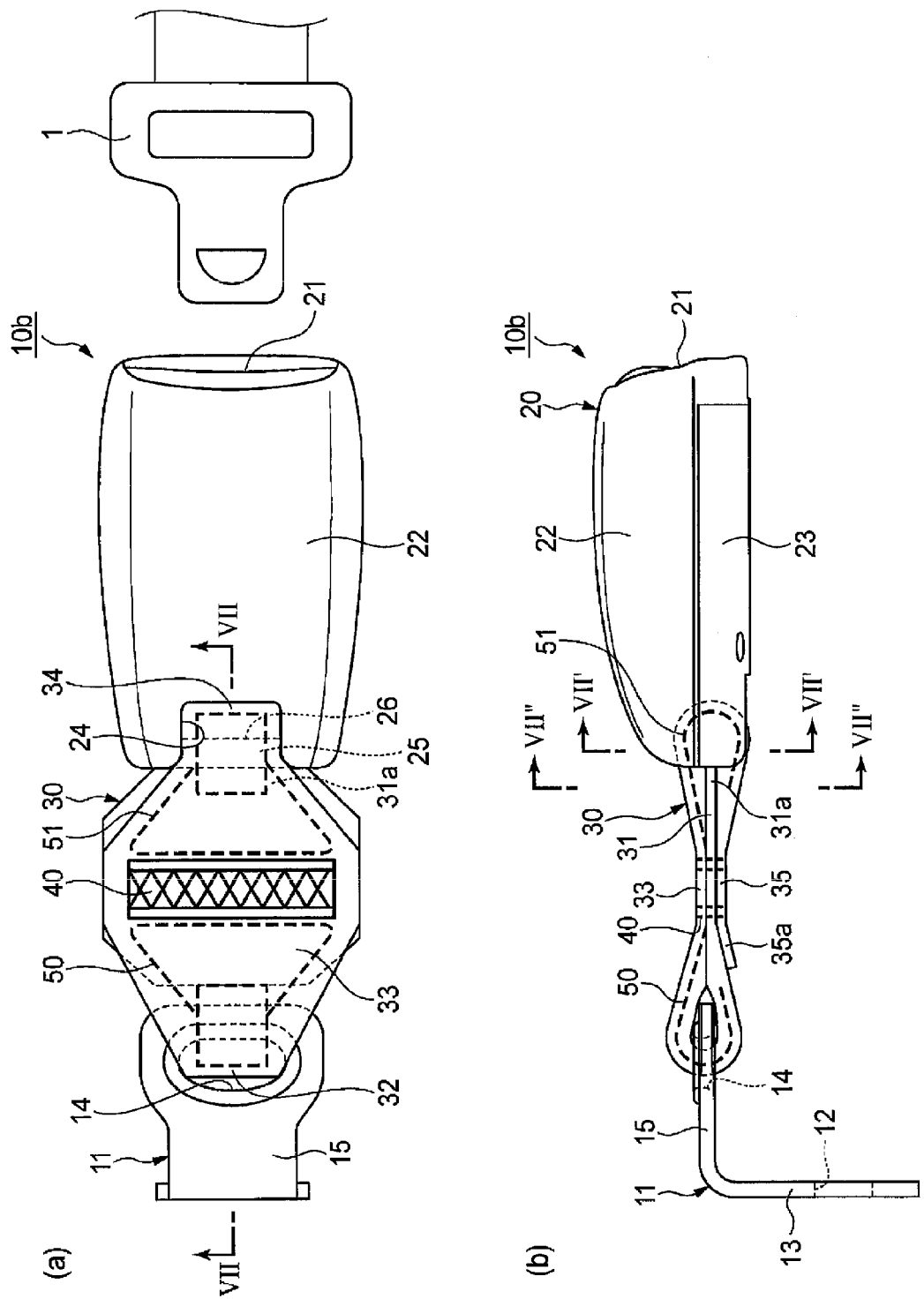
Figure 7:
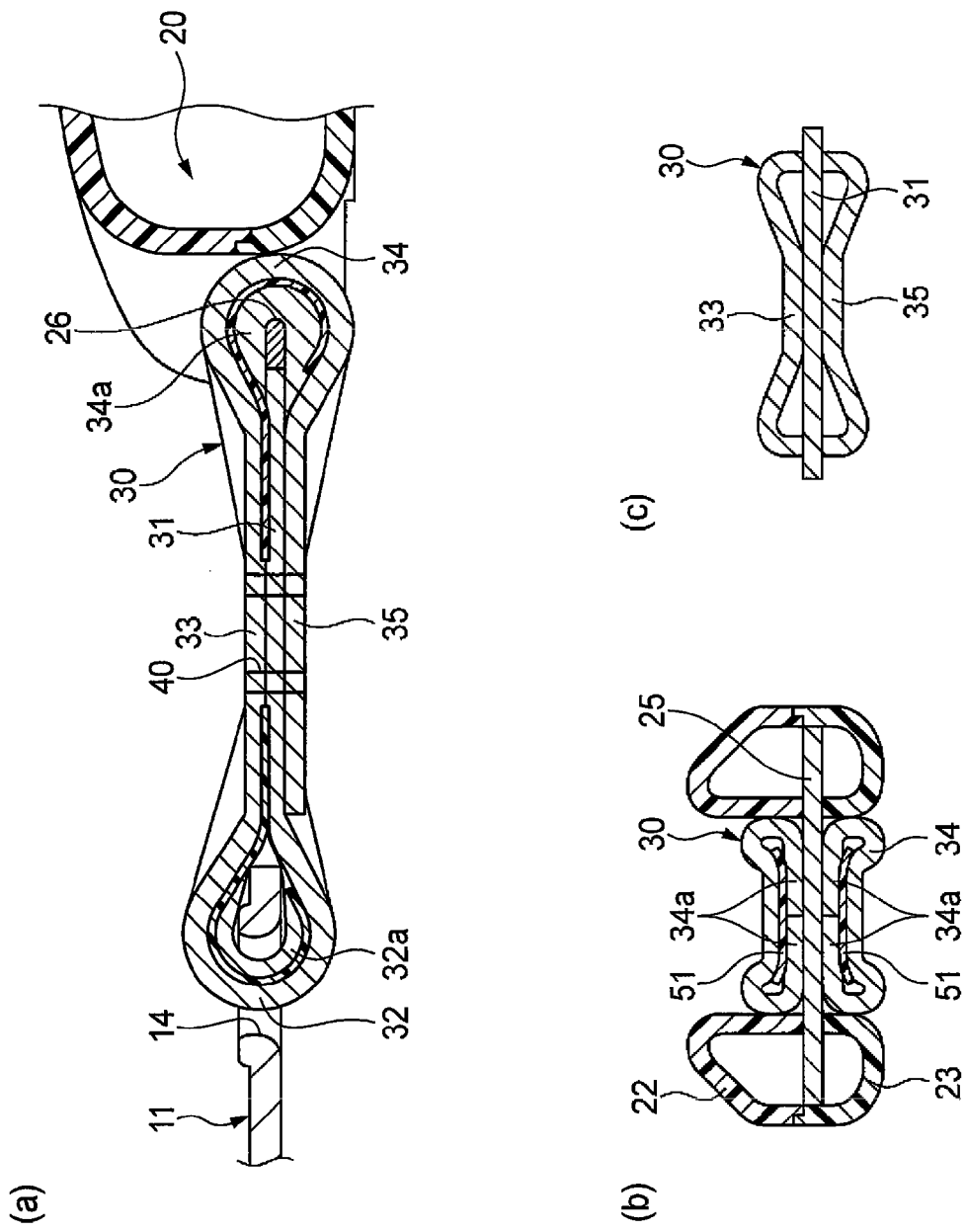
FIG. 7(a) is a sectional view taken along a VII-VII line in FIG. 6(a)
FIG. 7(b) is a sectional view taken along a VII'-VII' line in FIG. 6(b)
FIG. 7(c) is a sectional view taken along a VII"-VII" line in FIG. 6(b)

A buckle device 10*b* for a seat belt according to a third embodiment shown in FIGS. 6 and 7 differs from that of the first embodiment in that resin sheets 50, 51 are interposed from the folded back parts to the overlapping part of the woven fabric 30.

More specifically, in this example the resin sheets 50, 51 are constituted by polypropylene or the like having a thickness of approximately 0.8 mm, and are disposed respectively on the anchor plate side and the buckle side of the part that is sewn by the thread 40. The anchor plate side sheet 50 is sandwiched between doubled-back parts in which the two width direction edge portions 32*a* of the lower side folded-back part 32 are doubled back, and extends to the part in which the tucked-in part 31 and the front surface part 33 overlap. Likewise, the buckle side sheet 51 is sandwiched between doubled-back parts in which the two width direction edge portions 34*a* of the upper side folded-back part 34 are doubled back, and extends to the part in which the tucked-in part 31 and the front surface part 33 overlap. By interposing the resin sheets 50, 51 in the woven fabric 30 in this manner, the rigidity of a part between the sewn part and the anchor plate 11 or a part between the sewn part and the buckle 20 can be improved. Furthermore, since the sheets 50, 51 are interposed in the woven fabric 30, the sheets 50, 51 do not become dislodged. Moreover, the sheets 50, 51 are hidden from view, and therefore a pleasing outer form can be maintained.

All other constitutions and actions of the third embodiment are identical to those of the first embodiment.

Figure 8:
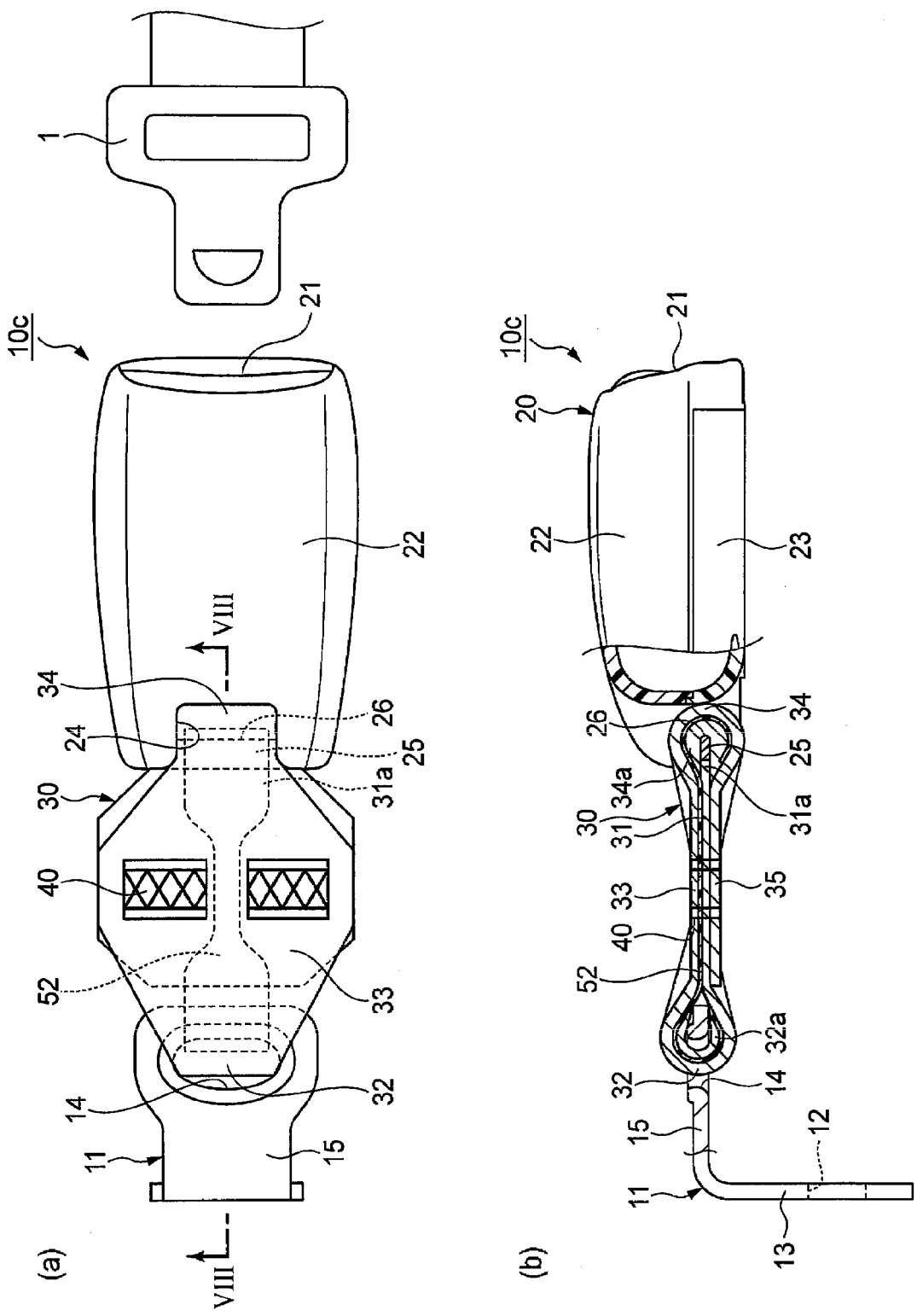

As illustrated by a seat belt device 10*c* according to a modified example shown in FIG. 8, the sewn part in which the woven fabric 30 is sewn may be divided in the width direction, and a resin sheet 52 may be passed through an intermediate width direction position removed from the sewn part and extended to the vicinity of the respective hole portions 14, 26 in the anchor plate 11 and buckle 20. In so doing, similar effects to those described above can be obtained with the single resin sheet 52.

(Fourth Embodiment)

Figure 9:
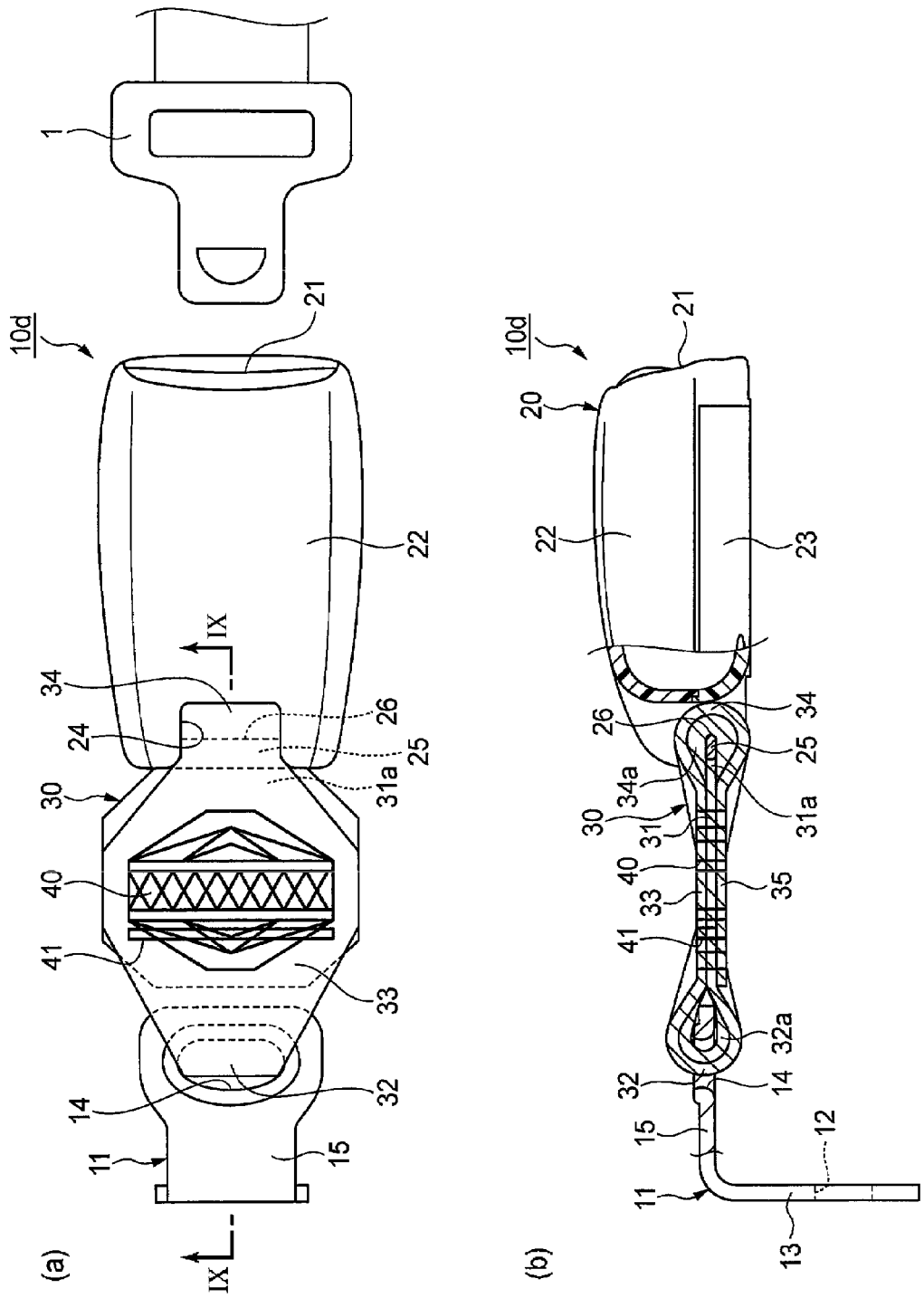

A buckle device 10*d* for a seat belt according to a fourth embodiment shown in FIG. 9 differs from that of the second embodiment in the sewn part where the woven fabric is sewn.

More specifically, the woven fabric 30 is sewn in the triply overlapped part up to positions near the doubled-back parts. In the parts where the two width direction edge portions 32*a*, 34*a* are doubled back on the inner side toward the width direction intermediate portion in the respective hole portions 14, 26 of the anchor plate 11 and buckle 20, rigidity is ensured by increasing the thickness of the woven fabric 30, and extending the sewn part in the lengthwise direction in the triply overlapped part between the doubled-back parts on either lengthwise direction side. Hence, a region of the woven fabric 30 having increased rigidity is enlarged, and the rigidity of the woven fabric 30 is increased over the entire lengthwise direction region.

Note that all other constitutions and actions of the fourth embodiment are identical to those of the second embodiment.

(Fifth Embodiment)

Figure 10:
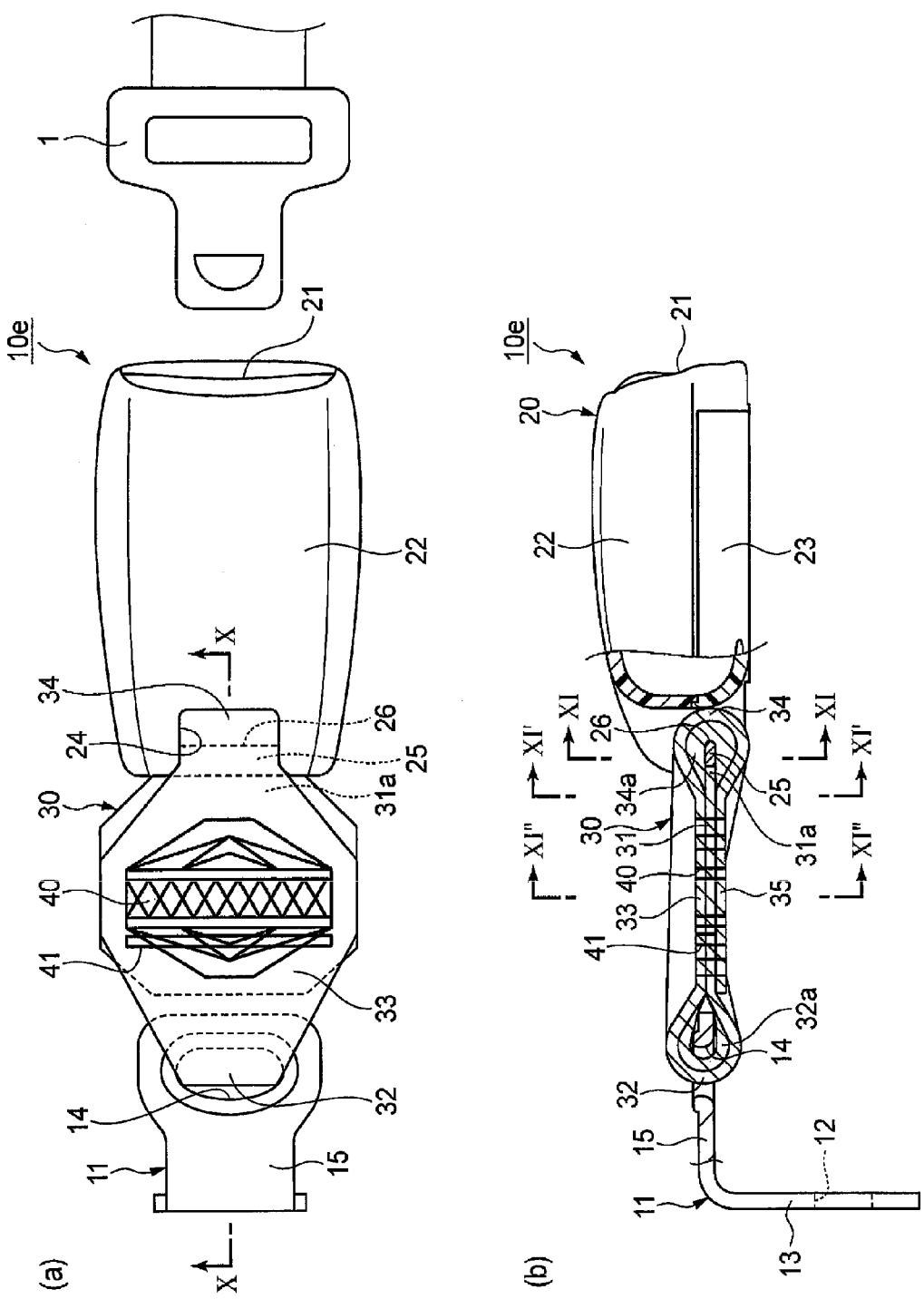
Figure 11:
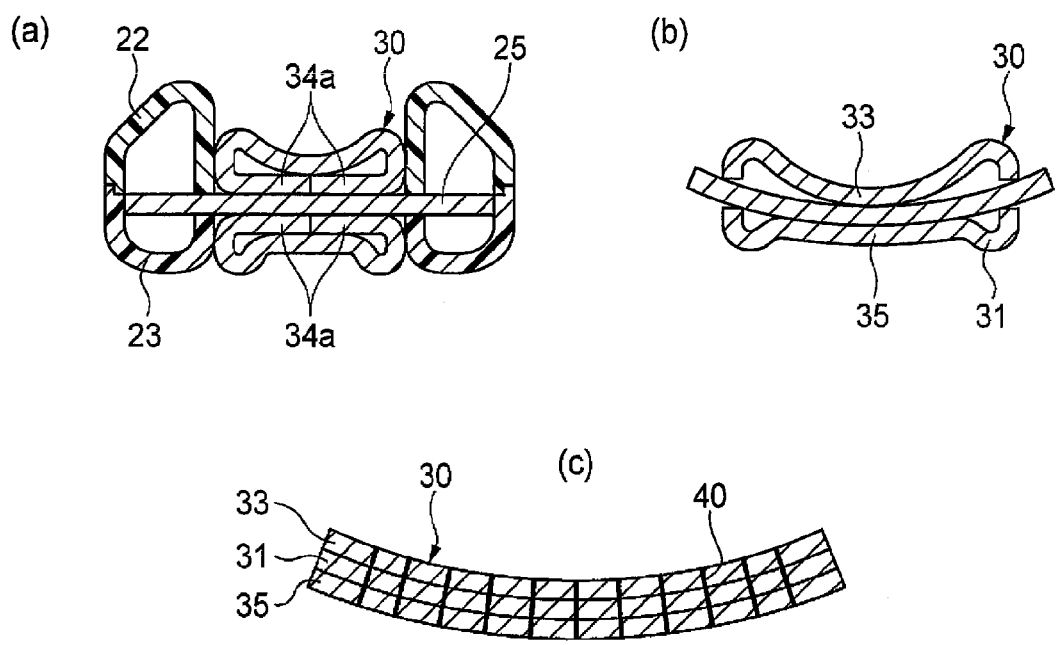
FIG. 11(a) is a sectional view taken along an XI-XI line in FIG. 10(b)
FIG. 11(b) is a sectional view taken along an XI'-XI' line in FIG. 10(b)
FIG. 11(c) is a sectional view taken along an XI"-XI" line in FIG. 10(b)

A buckle device 10e for a seat belt according to a fifth embodiment shown in FIGS. 10 and 11 differs from that of the fourth embodiment in the shape of the part where the woven fabric is sewn.

Figure 12:
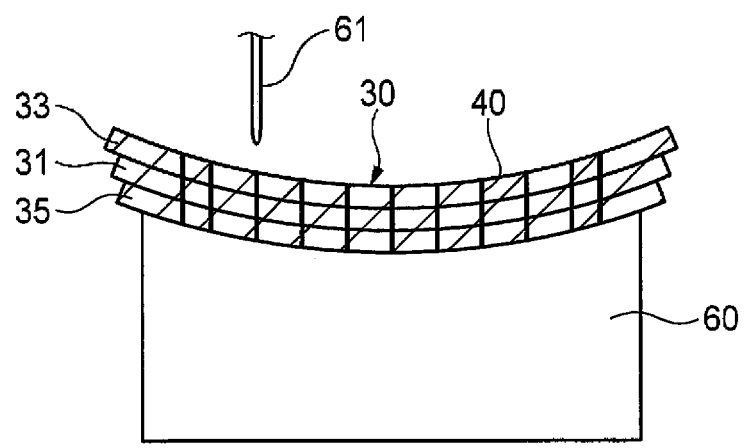
FIG. 12 is a view showing a woven fabric of FIG. 10 in a sewn state.

In this embodiment also, the woven fabric 30 is sewn in the triply overlapped part up to positions near the doubled-back parts. However, the overlapping part is sewn such that an arch-shaped cross-section is formed, as shown in FIG. 11(c). With this sectional shape, a section modulus of the overlapping part is increased, leading to an increase in rigidity. The overlapping part may be sewn into this sectional shape by placing the overlapping part on an arch-shaped cradle 60 of a sewing machine and sewing the overlapping part using a sewing needle 61, as shown in FIG. 12.

All other constitutions and actions of the fifth embodiment are identical to those of the fourth embodiment.

(Sixth Embodiment)

Figure 13:
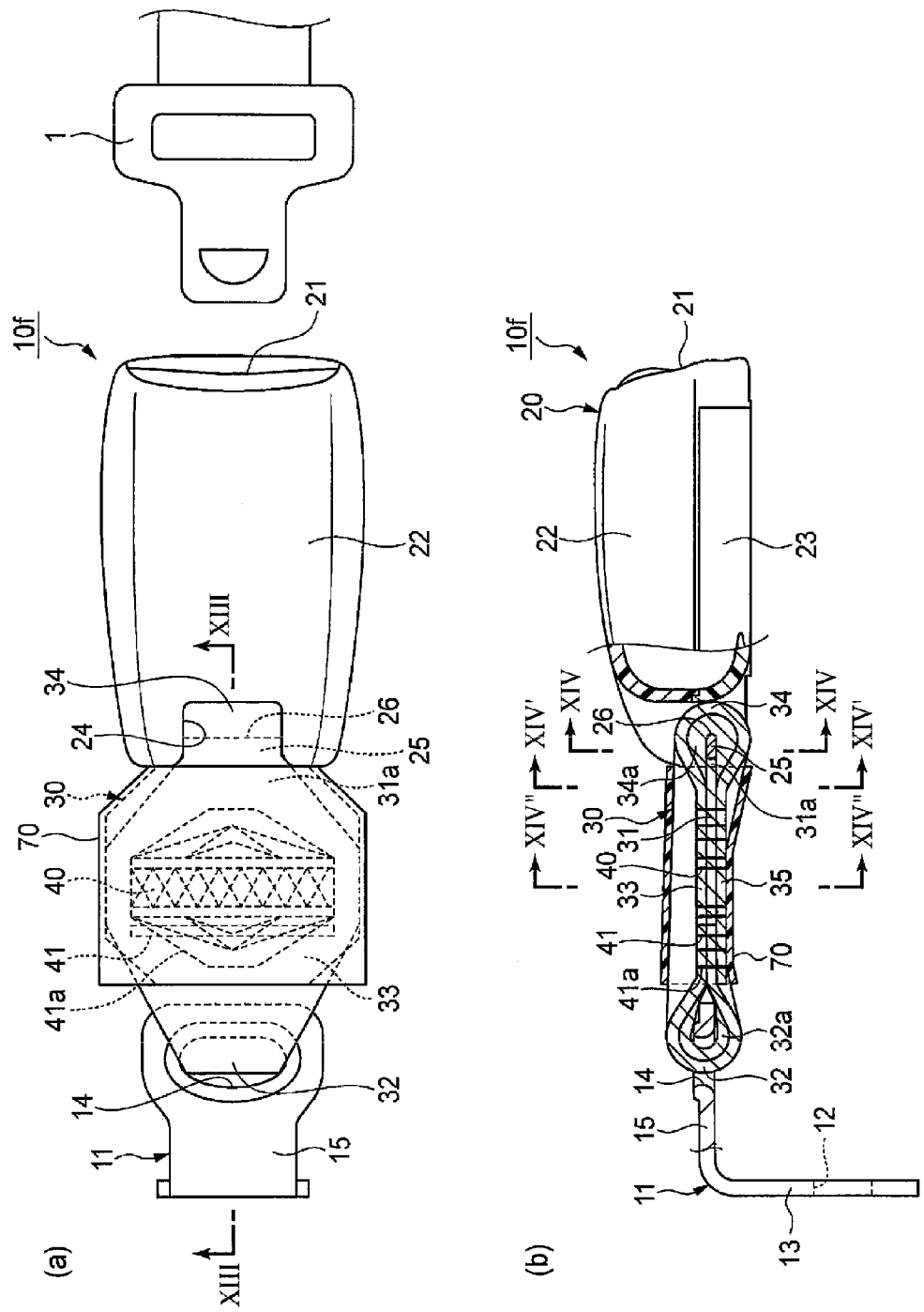
Figure 14:
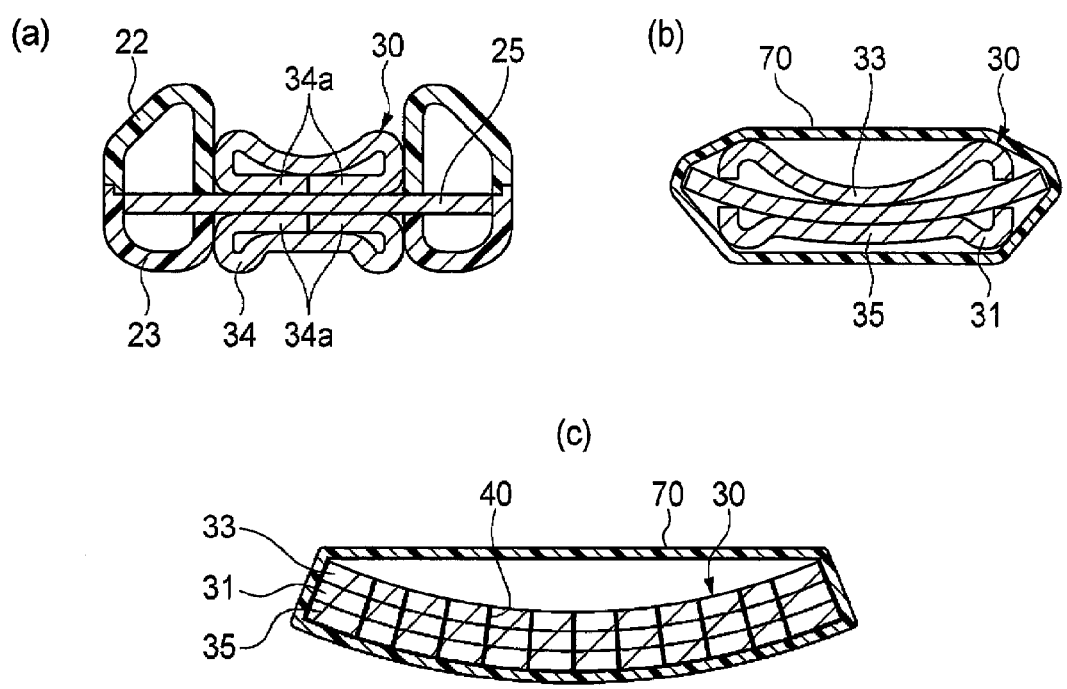
FIG. 14(a) is a sectional view taken along a XIV-XIV line in FIG. 13(b)
FIG. 14(b) is a sectional view taken along a XIV'-XIV' line in FIG. 13(b)
FIG. 14(c) is a sectional view taken along a XIV"-XIV" line in FIG. 13(b)

A buckle device 10f for a seat belt according to a sixth embodiment shown in FIGS. 13 and 14 differs from that of the fifth embodiment in that a periphery of the woven fabric 30 is covered by a resin member.

More specifically, in this embodiment, a tube 70 serving as the resin member is introduced from the anchor plate 11 side and attached to the periphery of the woven fabric 30 formed with an arch-shaped cross-section. The tube 70 is constituted by a resin material that stretches only slightly and is formed such that an inner peripheral length thereof is shorter than a sectional circumference of the woven fabric 30 and adhered to the periphery of the woven fabric 30. Thus, the arch-shaped cross-section of the woven fabric 30 can be maintained by the tube 70, thereby enabling an improvement in the rigidity of the woven fabric 30.

All other constitutions and actions of the sixth embodiment are identical to those of the fifth embodiment. Note that instead of using the tube 70 as the resin member, resin tape may be wound around the periphery of the woven fabric 30 to maintain the arch-shaped cross-section of the woven fabric 30.

(Seventh Embodiment)

Figure 15:
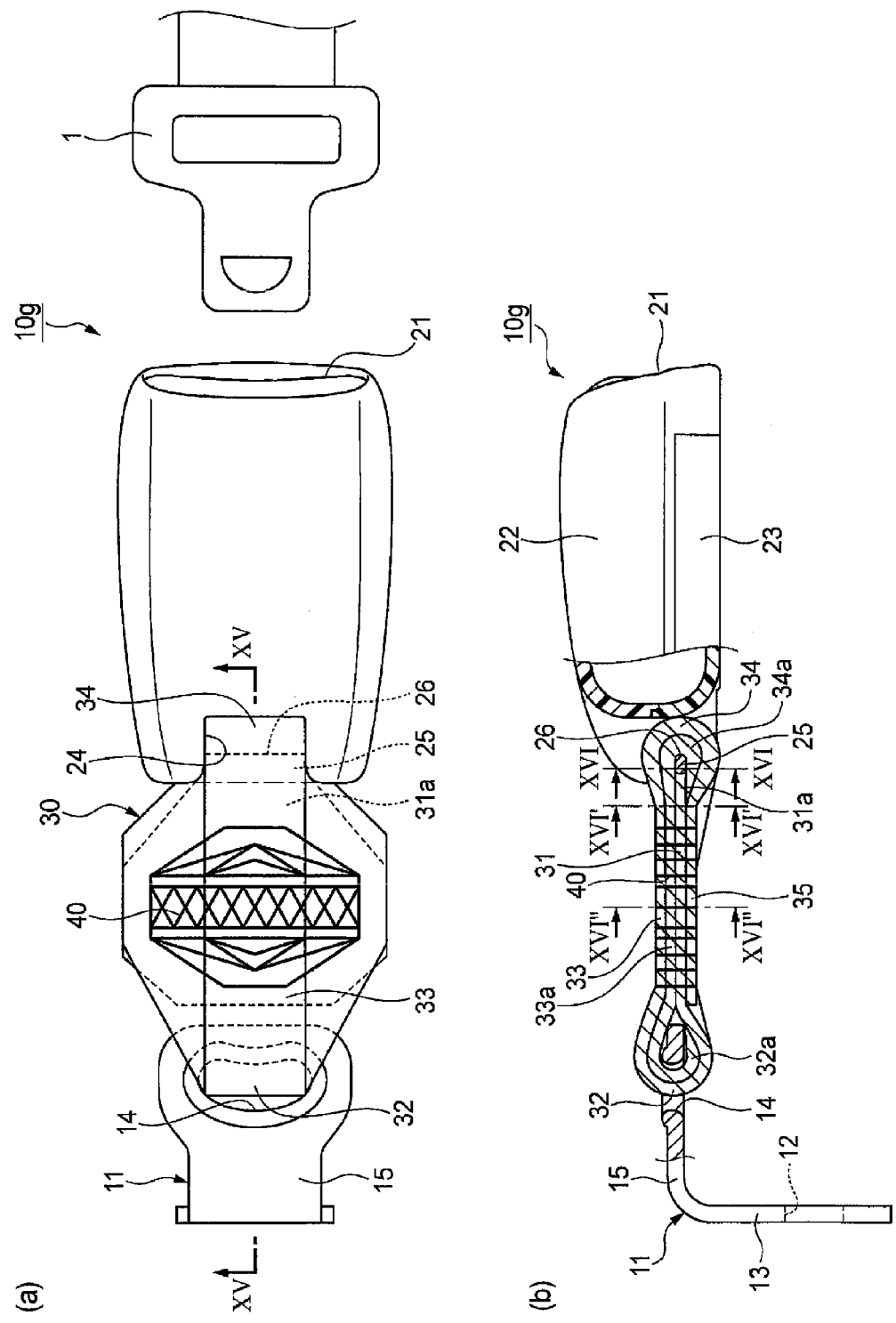
Figure 16:
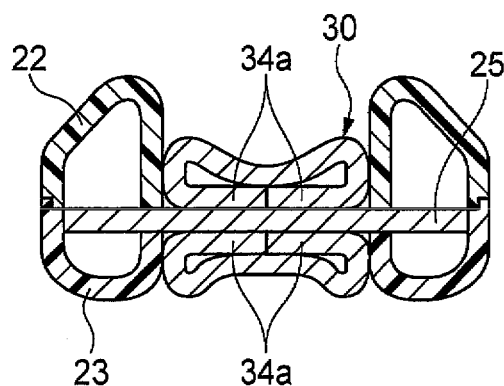
FIG. 16(a) is a sectional view taken along a XV-XV line in FIG. 15(b)
FIG. 16(b) is a sectional view taken along a XV'-XV' line in FIG. 15(b)
FIG. 16(c) is a sectional view taken along a XV"-XV" line in FIG. 15(b)
Figure 16:
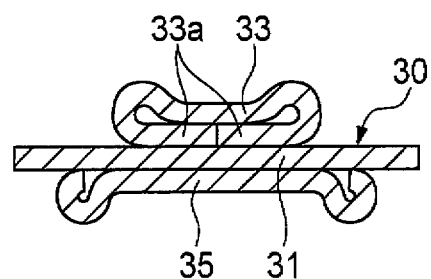
Figure 16:
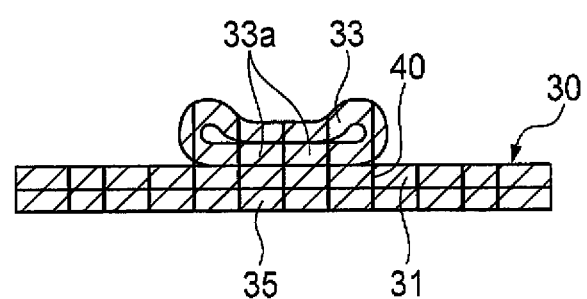
Figure 17:
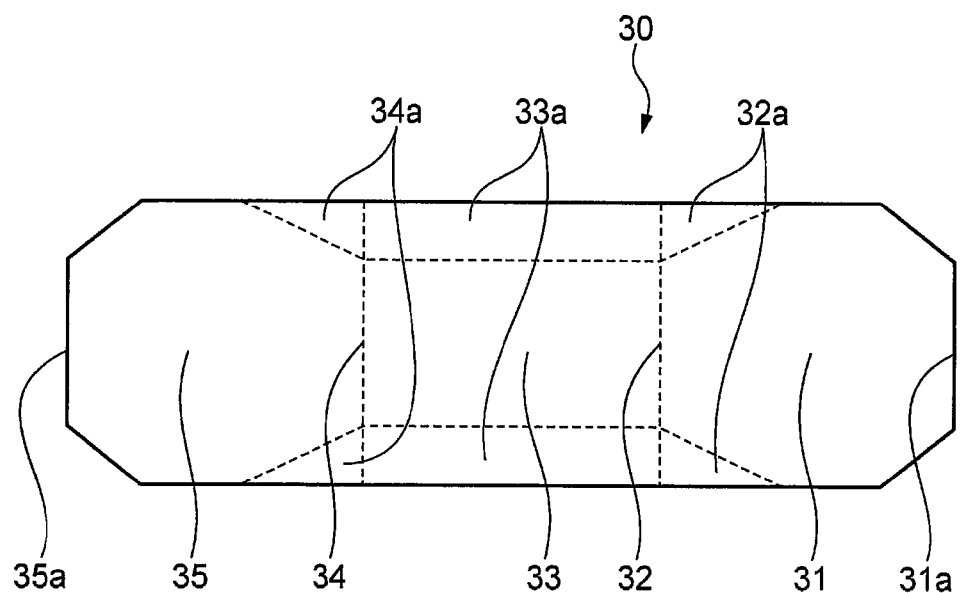
FIG. 17 is an expanded view of a woven fabric shown in FIG. 15.

A buckle device 10g for a seat belt according to a seventh embodiment shown in FIGS. 15 to 17 differs from that of the first embodiment in that the woven fabric 30 is sewn when the front surface part 33 is doubled back.

More specifically, in the embodiments described above, including this embodiment, two width direction edge portions 33a of the front surface part 33 located in the overlapping part of the woven fabric 30 between the folded-back parts 32, 34 that pass through the hole portion 26 in the buckle 20 and the hole portion 14 in the anchor plate 11, respectively, are doubled back on the inner side toward a width direction intermediate portion. In the embodiments described above, the front surface part 33 is passed through one of the hole portions 14, 26, unfolded, and then sewn. In this embodiment, on the other hand, the front surface part 33 is sewn together with the tucked-in part 31 and the rear surface part 35 while doubled back as described above. Accordingly, as shown by dotted lines in FIG. 17, the woven fabric 30 is sewn in a state where the two width direction edge portions 33a of the front surface part 33 are doubled back continuously from the two width direction edge portions 32a, 34a of the upper side and lower side folded-back parts 32, 34. As a result, a further improvement in the flexural rigidity of the woven fabric 30 can be achieved and a self-standing property can be ensured in the woven fabric 30. Note that in this embodiment, similarly to the fourth embodiment, the woven fabric 30 is sewn in the triply overlapping part up to positions near the doubled back parts 32a, 34a.

All other constitutions and actions of the seventh embodiment are identical to those of the first embodiment.

(Eighth Embodiment)

Figure 18:
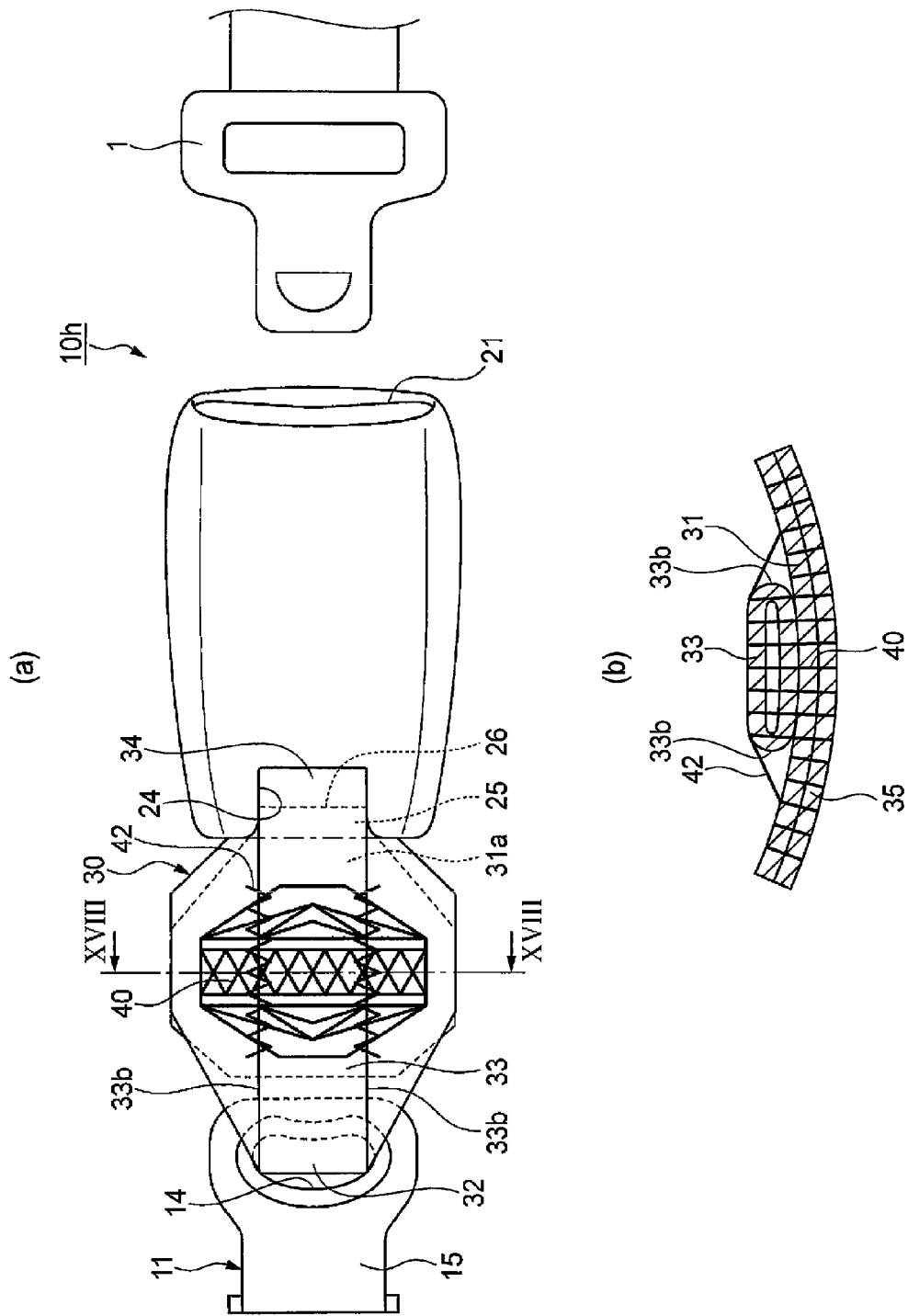
Figure 19:
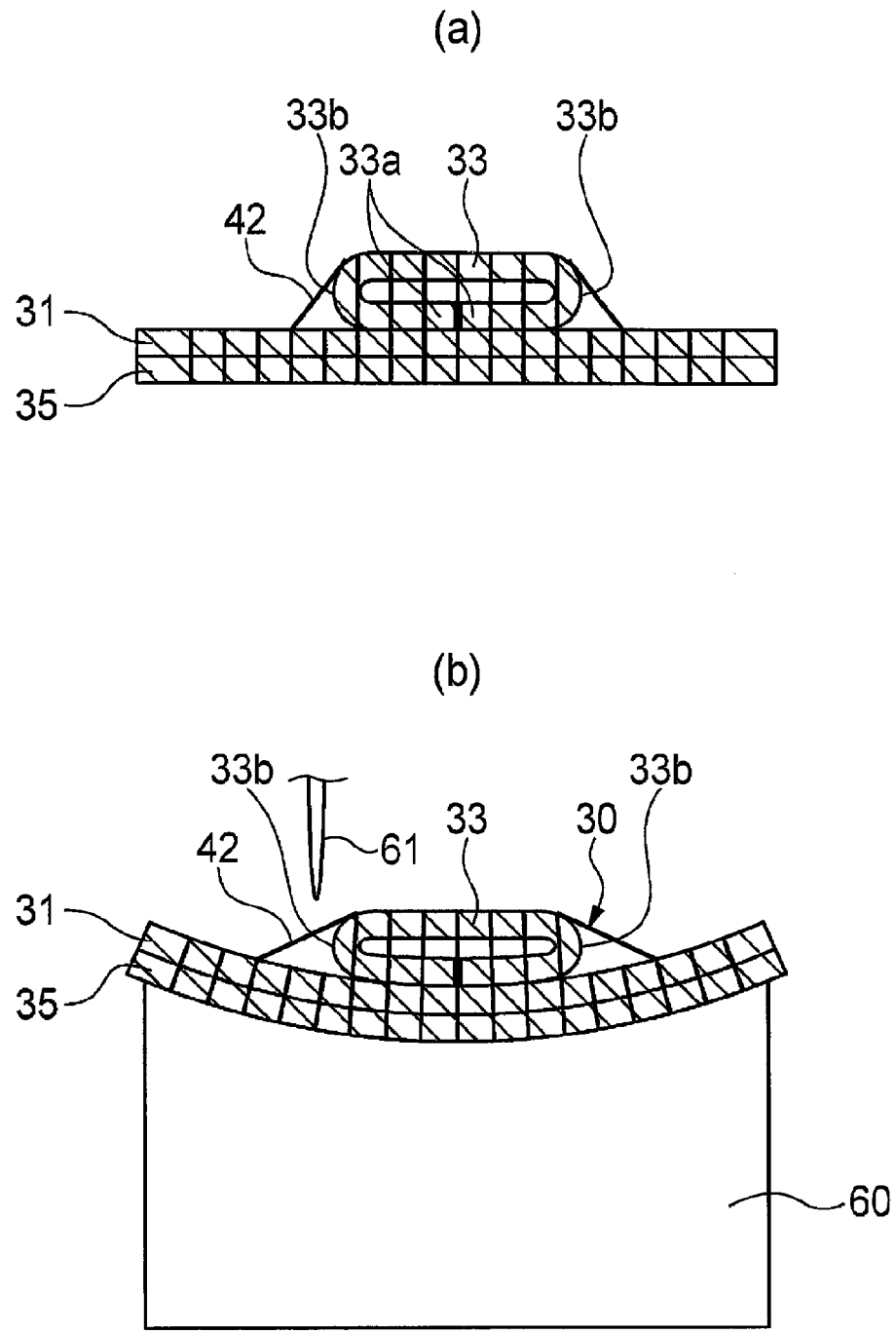
FIG. 19(a) shows a state prior to cross-stitching of a woven fabric shown in FIG. 18.
FIG. 19(b) is a view showing a state during cross-stitching.

A buckle device 10h for a seat belt according to an eighth embodiment shown in FIGS. 18 and 19 differs from that of the seventh embodiment in that an arch-shaped cross-section is formed by cross-stitching.

More specifically, similarly to the seventh embodiment, the woven fabric 30 is sewn in a state where the two width direction edge portions of the front surface part 33 are doubled back on the inner side toward the width direction intermediate portion (see FIG. 19(a)). Furthermore, in this embodiment, as shown in FIG. 19(b), the overlapping part of the woven fabric 30 is placed on an arch-shaped cradle 60 of a sewing machine and cross-stitched using a sewing needle 62 up to positions near the folded-back parts 32, 34 so as to cross a bent part 33b of the front surface part 33 and to extend from the tucked-in part 31 back to the tucked-in part 31 via the front surface part 33 in the width direction. Hence, in this embodiment, the doubled-back front surface part 33 is sewn more securely and the section modulus is increased by providing the overlapping part with an arch-shaped cross-section. As a result, a further increase in rigidity can be achieved.

All other constitutions and actions of the eighth embodiment are identical to those of the seventh embodiment.

(Ninth Embodiment)

Figure 20:
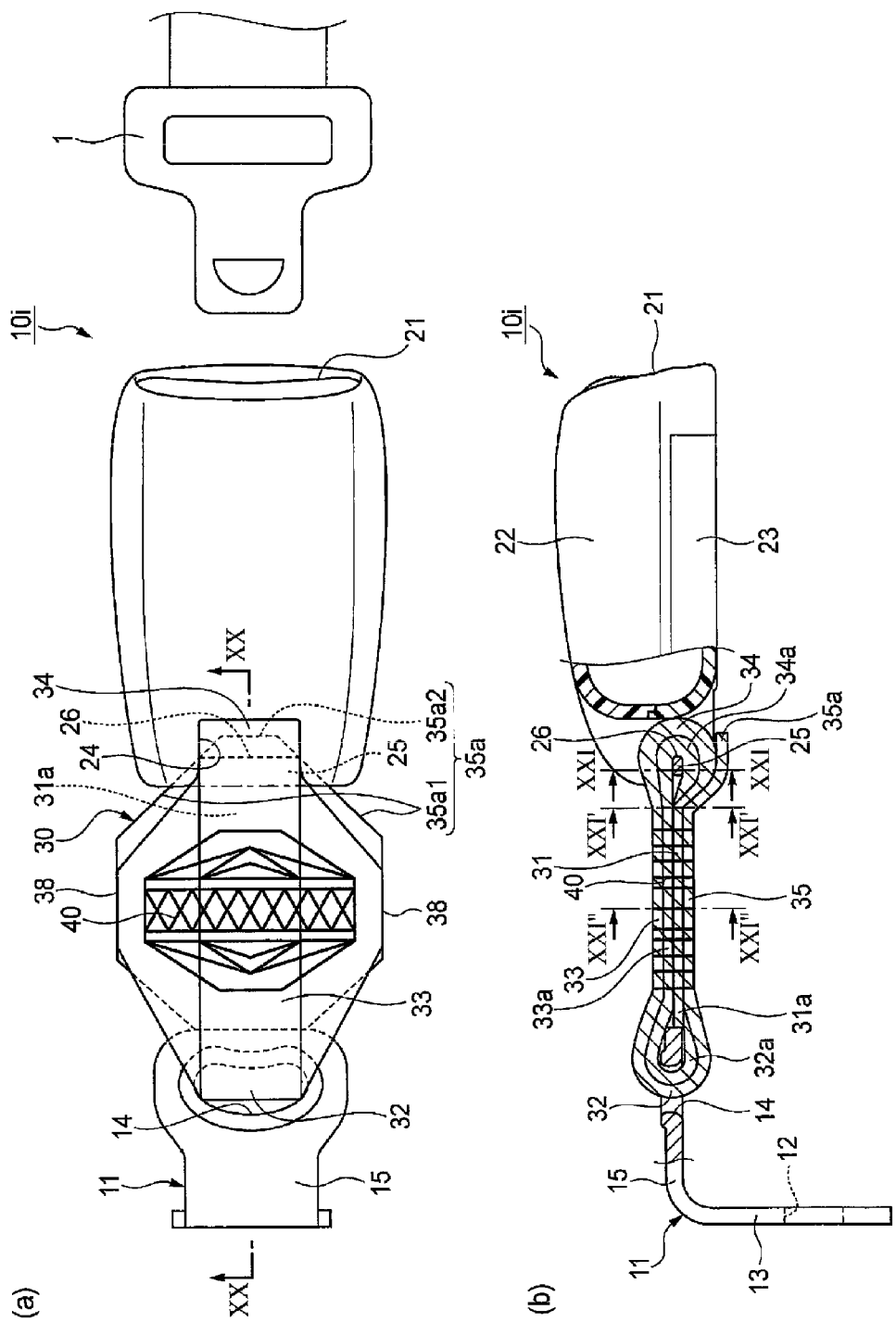
Figure 21:
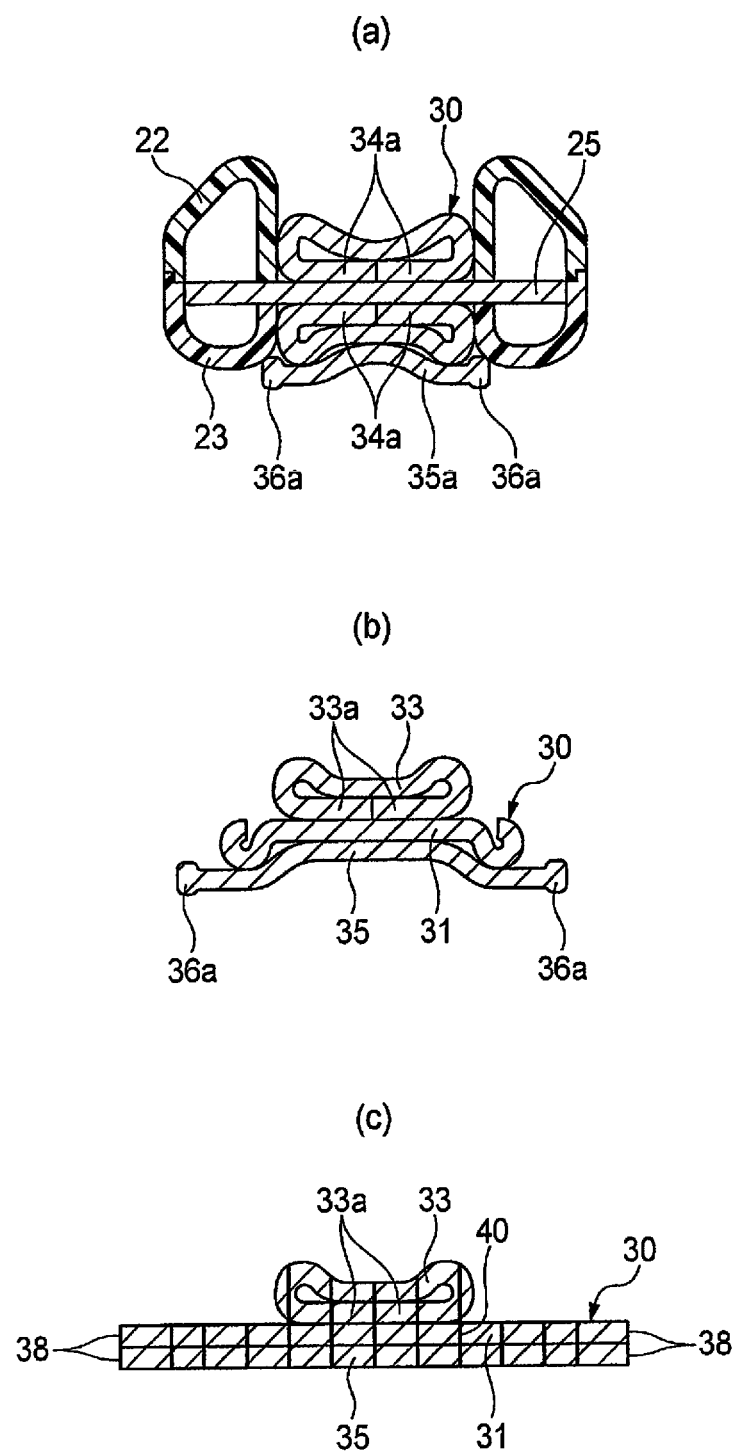
FIG. 21(a) is a sectional view taken along a XXI-XXI line in FIG. 20(b)
FIG. 21(b) is a sectional view taken along a XXI'-XXI' line in FIG. 20(b)
FIG. 21(c) is a sectional view taken along a XXI"-XXI" line in FIG. 20(b)
Figure 22:
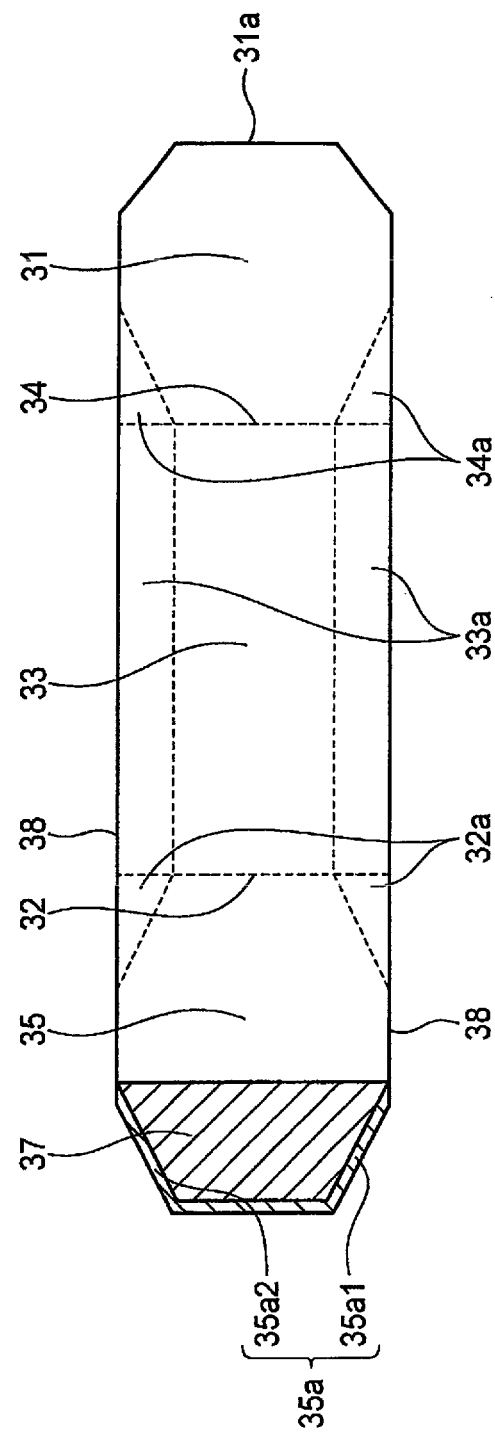
FIG. 22 is an expanded view of a woven fabric shown in FIG. 20.

In a buckle device 10i for a seat belt according to a ninth embodiment shown in FIGS. 20 to 22, the part of the woven fabric 30 that passes through the hole portion 26 in the buckle 20 is formed as the tucked-in part 31, the tip end portion 31a of which contacts the anchor plate 11, and a part of the woven fabric 30 on the lower side of the drawings, which passes through the hole portion 14 in the anchor plate 11, is formed as the rear surface part 35. Further, the rear surface part 35 is extended to the vicinity of the hole portion 26 in the buckle 20, thereby improving the rigidity of the woven fabric 30.

Further, a lengthwise direction tip end portion 35a of the rear surface part 35 of the woven fabric 30, which is constituted by a pair of inclined portions 35a1 and an intermediate portion 35a2 located between the inclined portions 35a1, is melted slightly excessively during heat cutting so as to be formed into a piping shape having a dimension that is equal to or greater than the thickness of the woven fabric 30, and as a result, the rigidity of a tip end portion 36 is increased. Furthermore, the rear surface part 35 includes a part located in a region extending from a lengthwise direction sewn part to the tip end portion 35a where threads on at least one surface 37 of an inside surface and an outside surface are fixed to each other by hot-melting. As a result, the tip end portion 35a forms a resin plate, enabling an improvement in the flexural rigidity thereof. In this case, the rear surface part 35 of the woven fabric 30 is more difficult to fold, and therefore the tucked-in part 31 is passed through the hole portion 14 in the anchor plate 11 and the hole portion 26 in the buckle 20 and then sewn.

Further, the woven fabric 30 is provided with a selvage for improving texture on a width direction outer side of a strength-receiving warp thread and a catch thread for preventing fraying of a weft thread. By fixing the threads on an ear portion 38 of the woven fabric 30 through hot-melting, an overall improvement in rigidity can be achieved without affecting the strength and fraying prevention property.

All other constitutions and actions of the ninth embodiment are identical to those of the seventh embodiment. Note that similarly to the embodiments described above, the part of the woven fabric 30 that passes through the hole portion 14 of the anchor plate 11 may be formed as the tucked-in part 31 that contacts the metal plate portion 25 of the buckle, the part of the woven fabric 30 that passes through the hole portion 26 of the buckle 20 may be formed as the rear surface part 35, and the rear surface part 35 may be extended to the vicinity of the hole portion 14 in the anchor plate 11.

The present invention is not limited to the embodiments described above, and may be modified, improved, and so on appropriately. Further, the respective embodiments may be applied in combinations within a feasible scope, and the object of the present invention may be achieved individually by the features of the respective embodiments.

For example, the second to ninth embodiments preferably include the featured constitution of the first embodiment whereby the tip end portion 31a of the woven fabric 30 that is tucked in on the inner side contacts the buckle 20, but the object of the present invention can be achieved by the features of the second to ninth embodiments regardless of whether or not this feature of the first embodiment is employed.

Furthermore, in the embodiments described above, the tip end portion 31a of the woven fabric 30 that is tucked in on the inner side contacts the buckle 20, but identical effects can be achieved when the tip end portion 31a contacts the anchor plate 11.

Note that this application is based on a Japanese Patent Application (No. 2007-235456) filed on Sep. 11, 2007, the contents of which are incorporated herein by reference.

While presently preferred embodiments have been described, it should be understood that modifications may be made without departing from the invention. The scope of the invention is defined by the appended claims, and all devices that come within the meaning of the claims, either literally or by equivalence, are intended to be embraced therein. Furthermore, the advantages of the embodiments described above are not necessarily the only advantages of the embodiments, and it is not necessarily expected that all of the described advantages will be achieved with every embodiment.

The invention claimed is:

1. A buckle device for a seat belt, comprising:
an anchor plate configured to be attached to a vehicle body side;
a buckle that is detachably attached to a tongue of a seat belt; and
a woven fabric extending through a first hole portion formed in said anchor plate and a second hole portion formed in said buckle, said woven fabric being folded back and forming an overlapping configuration having an overlapping part with a triple thickness of said woven fabric,
wherein said overlapping part comprises a tucked-in part that is tucked into an inner side thereof, a front surface part that is folded back from said tucked-in part and forms a continuation thereof, and a rear surface part that is folded back from said front surface part and forms a continuation thereof,
wherein respective width direction edge portions of respective folded-back parts formed by said woven fabric, which extend through said first and second hole portions and that are folded back, are doubled back on said inner side toward an intermediate portion in the width direction, and
wherein said woven fabric is fixed in place by stitches disposed in said overlapping part with a triple thickness, said stitches thereby securing said woven fabric in said overlapping configuration; and
wherein a tip end portion of said tucked-in part contacts the buckle or the anchor plate.

2. The buckle device for a seat belt according to claim 1, wherein said tip end portion of said tucked-in part contacts a metal plate portion in which said hole portion of said buckle is formed.

3. The buckle device for a seat belt according to claim 1 wherein said woven fabric is tacked together in a part disposed where said tucked-in part and said front surface part overlap.

4. The buckle device for a seat belt according to claim 1, further comprising a resin sheet interposed between said folded-back parts and said overlapping part.

5. The buckle device for a seat belt according to claim 4, wherein said stitches are divided in said width direction of said woven fabric, and said resin sheet extends beyond said sewn part to a vicinity of said first and second hole portions of said anchor plate and said buckle, respectively.

6. The buckle device for a seat belt according to claim 1, wherein said stitches in said overlapping part having said triple thickness extend to positions disposed near said parts where said respective width direction edge portions are doubled back on said inner side toward said intermediate portion in said width direction.

7. The buckle device for a seat belt according to claim 1, wherein said overlapping part of said woven fabric has an arch-shaped cross-section.

8. The buckle device for a seat belt according to claim 1, wherein a periphery of said overlapping part of said woven fabric is covered by a resin member.

9. The buckle device for a seat belt according to claim 1, wherein said front surface part disposed between said folded-back parts extending through said first and second hole portions of said overlapping part is sewn in a state where said respective width direction edge portions are doubled back on said inner side toward said intermediate portion in said width direction.

10. The buckle device for a seat belt according to claim 9, wherein said woven fabric is cross-stitched in said width direction so as to cross over said front surface part from a first portion of said tucked-in part to a second portion of said tucked-in part, and wherein said overlapping part has an arch-shaped cross-section.

11. The buckle device for a seat belt according to claim 1, wherein said rear surface part extends to &aid-a vicinity of said first and second hole portions.

12. The buckle device for a seat belt according to claim 11, wherein a lengthwise direction tip end portion of said rear surface part is formed by heat cutting said woven fabric into a piping shape having a dimension that is equal to or greater than a thickness of said woven fabric.

13. The buckle device for a seat belt according to claim 11, wherein said rear surface part includes a part located in a region extending from a lengthwise direction sewn part to said tip end portion where threads on at least one of an inside surface and an outside surface of said woven fabric are fixed to each other by hot-melting.

14. The buckle device for a seat belt according to claim 11, wherein threads on an ear portion of said woven fabric are fixed to each other by hot-melting.

15. A method of manufacturing a buckle device for a seat belt, said method comprising:
- providing an anchor plate configured to attach to a vehicle body side;
- providing a buckle to which a tongue of a seat belt is configured to detachably attach;
- providing a woven fabric, said woven fabric comprising a tucked-in part that is tucked into an inner side thereof, a front surface part that is folded back from said tucked-in part and forms a continuation thereof, and a rear surface part that is folded back from said front surface part and forms a continuation thereof;
- passing said woven fabric through first and second hole portions formed in said anchor plate and said buckle, respectively;
- folding said woven fabric to form an overlapping configuration having an overlapping part with a triple thickness of said woven fabric;
- passing a part of said woven fabric, which has a substantially uniform width from a tucked-in part to a rear surface part, through said first and second hole portions in a state where respective width direction edge portions thereof are doubled back on said inner side toward an intermediate portion in the width direction; and
- sewing said overlapping part having said triple thickness of said woven fabric while said respective width direction edge portions of folded-back parts, which are folded back by passing said woven fabric through said first and second hole portions, remain doubled back on said inner side toward said intermediate portion in said width direction.

16. The method of manufacturing a buckle device for a seat belt according to claim 15, further comprising the act of tacking a second overlapped part having a double thickness of said woven fabric after passing said woven fabric through one of said first and second hole portions and folding said woven fabric back.

17. The method of manufacturing a buckle device for a seat belt according to claim 15, further comprising the act of causing a tip end portion of said tucked-in part to contact said anchor plate or said buckle.

18. The buckle device for a seat belt according to claim 1, wherein said overlapping part further comprises a resin sheet disposed between at least a portion of overlapping layers of said woven fabric.

19. The buckle device for a seat belt according to claim 18, wherein said resin sheet extends past a position that is separated from said stitches in said triple thickness of said woven fabric, and continues to a vicinity of said first and second hole portions in said anchor plate and said buckle.

* * * * *

UNITED STATES PATENT AND TRADEMARK OFFICE
CERTIFICATE OF CORRECTION

PATENT NO. : 8,650,721 B2
APPLICATION NO. : 12/676800
DATED : February 18, 2014
INVENTOR(S) : Kiyoshi Ogawa et al.

It is certified that error appears in the above-identified patent and that said Letters Patent is hereby corrected as shown below:

In the Claims

Column 12, line 52 after "to" delete "&aid-"

Signed and Sealed this
Twenty-seventh Day of May, 2014

Michelle K. Lee
*Deputy Director of the United States Patent and Trademark Office*